(12) United States Patent
Chen

(10) Patent No.: US 11,106,012 B2
(45) Date of Patent: Aug. 31, 2021

(54) OPTICAL LENS ASSEMBLY, IMAGING APPARATUS AND ELECTRONIC DEVICE

(71) Applicant: LARGAN PRECISION CO., LTD., Taichung (TW)

(72) Inventor: Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 195 days.

(21) Appl. No.: 16/515,258

(22) Filed: Jul. 18, 2019

(65) Prior Publication Data
US 2020/0326510 A1    Oct. 15, 2020

(30) Foreign Application Priority Data

Apr. 10, 2019  (TW) ................................. 108112476

(51) Int. Cl.
| | |
|---|---|
| *G02B 13/00* | (2006.01) |
| *G02B 13/18* | (2006.01) |
| *G02B 13/02* | (2006.01) |
| *H04N 5/225* | (2006.01) |
| *G02B 9/62* | (2006.01) |
| *G02B 5/00* | (2006.01) |

(Continued)

(52) U.S. Cl.
CPC ........... *G02B 13/0045* (2013.01); *G02B 9/62* (2013.01); *G02B 13/02* (2013.01); *G02B 13/18* (2013.01); *H04N 5/2254* (2013.01); *G02B 3/04* (2013.01); *G02B 5/005* (2013.01); *G02B 13/001* (2013.01); *G02B 13/002* (2013.01); *G02B 13/04* (2013.01); *G02B 15/177* (2013.01); *G02B 27/0025* (2013.01)

(58) Field of Classification Search
CPC .. G02B 13/0045; G02B 9/62; G02B 27/0025; G02B 13/18; G02B 5/005; G02B 13/002; G02B 3/04; G02B 13/04; G02B 13/001; G02B 13/02; G02B 15/177; H04N 5/2254
USPC ........................................ 359/713, 740, 762
See application file for complete search history.

(56) References Cited

U.S. PATENT DOCUMENTS

| | | |
|---|---|---|
| 2016/0223796 A1 | 8/2016 | Lee et al. |
| 2017/0108666 A1 | 4/2017 | Lee |

(Continued)

FOREIGN PATENT DOCUMENTS

| | | |
|---|---|---|
| CN | 107203033 A | 9/2017 |
| JP | 2015125405 A | 7/2015 |

*Primary Examiner* — Evelyn A Lester
(74) *Attorney, Agent, or Firm* — Locke Lord LLP; Tim Tingkang Xia, Esq.

(57) ABSTRACT

An optical lens assembly includes, in order from an object side to an image side, six lens elements. The first lens element with negative refractive power has an object-side surface being concave in a paraxial region thereof and at least one convex critical point in an off-axis region of the object-side surface thereof, and both the object-side surface and an image-side surface thereof are aspheric. The second lens element has negative refractive power. The third lens element has positive refractive power. The fourth lens element has negative refractive power. The fifth lens element has positive refractive power. The sixth lens element with negative refractive power has an image-side surface being concave in a paraxial region thereof and at least one convex critical point in an off-axis region of the image-side surface thereof. Both an object-side surface and the image-side surface of the sixth lens element are aspheric.

20 Claims, 20 Drawing Sheets

(51) Int. Cl.
*G02B 15/177* (2006.01)
*G02B 27/00* (2006.01)
*G02B 3/04* (2006.01)
*G02B 13/04* (2006.01)

(56) References Cited

U.S. PATENT DOCUMENTS

2017/0235109 A1 8/2017 Shin et al.
2020/0057268 A1* 2/2020 Chen ................. G02B 13/0045

* cited by examiner

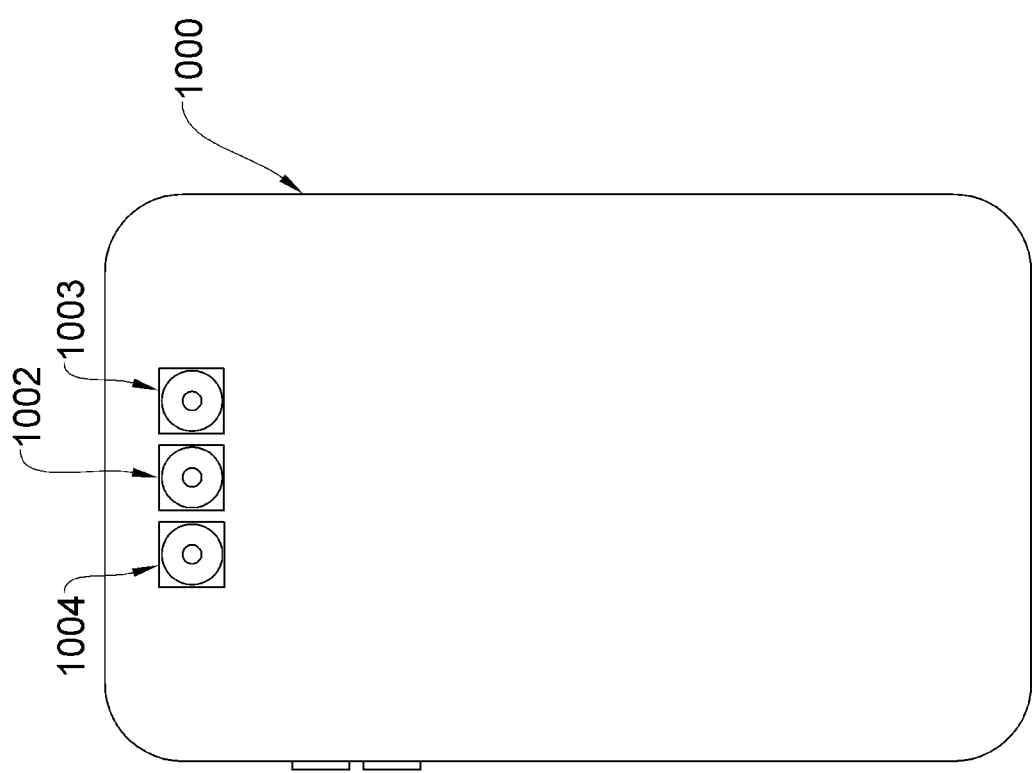

OPTICAL LENS ASSEMBLY, IMAGING APPARATUS AND ELECTRONIC DEVICE

RELATED APPLICATIONS

This application claims priority to Taiwan Application Serial Number 108112476, filed on Apr. 10, 2019, which is incorporated by reference herein in its entirety.

BACKGROUND

Technical Field

The present disclosure relates to an optical lens assembly and an imaging apparatus, and more particularly, to an optical lens assembly and an imaging apparatus applicable to electronic devices.

Description of Related Art

With the advancement of semiconductor process technology, the performance of image sensors has been improved, and the pixels have been reduced to an even smaller size. Therefore, optical lens assemblies with high image quality have become an indispensable part of modern electronic devices.

With the rapid development of technology, applications of electronic devices equipped with optical lens assemblies increase significantly, and the requirements for optical lens assemblies are more diverse. It is difficult for conventional optical lens assemblies to balance among the requirements such as image quality, sensitivity, aperture size, volume or viewing angle. Therefore, there is a need for providing an optical lens assembly to satisfy the aforementioned requirements.

SUMMARY

According to one aspect of the present disclosure, an optical lens assembly, comprises, in order from an object side to an image side: a first lens element, a second lens element, a third lens element, a fourth lens element, a fifth lens element, and a sixth lens element. The first lens element with negative refractive power has an object-side surface being concave in a paraxial region thereof, at least one convex critical point in an off-axis region of the object-side surface thereof and both the object-side surface and an image-side surface thereof being aspheric. The second lens element has negative refractive power. The third lens element has positive refractive power. The fourth lens element has negative refractive power. The fifth lens element has positive refractive power. The sixth lens element with negative refractive power has an image-side surface being concave in a paraxial region thereof, at least one convex critical point in an off-axis region of the image-side surface thereof, and both an object-side surface and the image-side surface thereof being aspheric.

When the optical lens assembly has a total of six lens elements, a focal length of the optical lens assembly is f, and a curvature radius of the object-side surface of the first lens element is R1, the following condition is satisfied:

$$f/R1 < -0.40.$$

According to another aspect of the present disclosure, an imaging apparatus comprises the aforementioned optical lens assembly and an image sensor disposed on an image surface of the optical lens assembly.

According to another aspect of the present disclosure, an electronic device comprises at least two imaging apparatuses facing toward the same side, wherein at least one of the at least two imaging apparatuses is the aforementioned imaging apparatus, and the fields of view of the at least two imaging apparatuses differ by at least 20 degrees.

BRIEF DESCRIPTION OF THE DRAWINGS

FIG. 10B shows a rear view of the electronic device according to the 9th embodiment of the present disclosure.

DETAILED DESCRIPTION

Figure 1A:
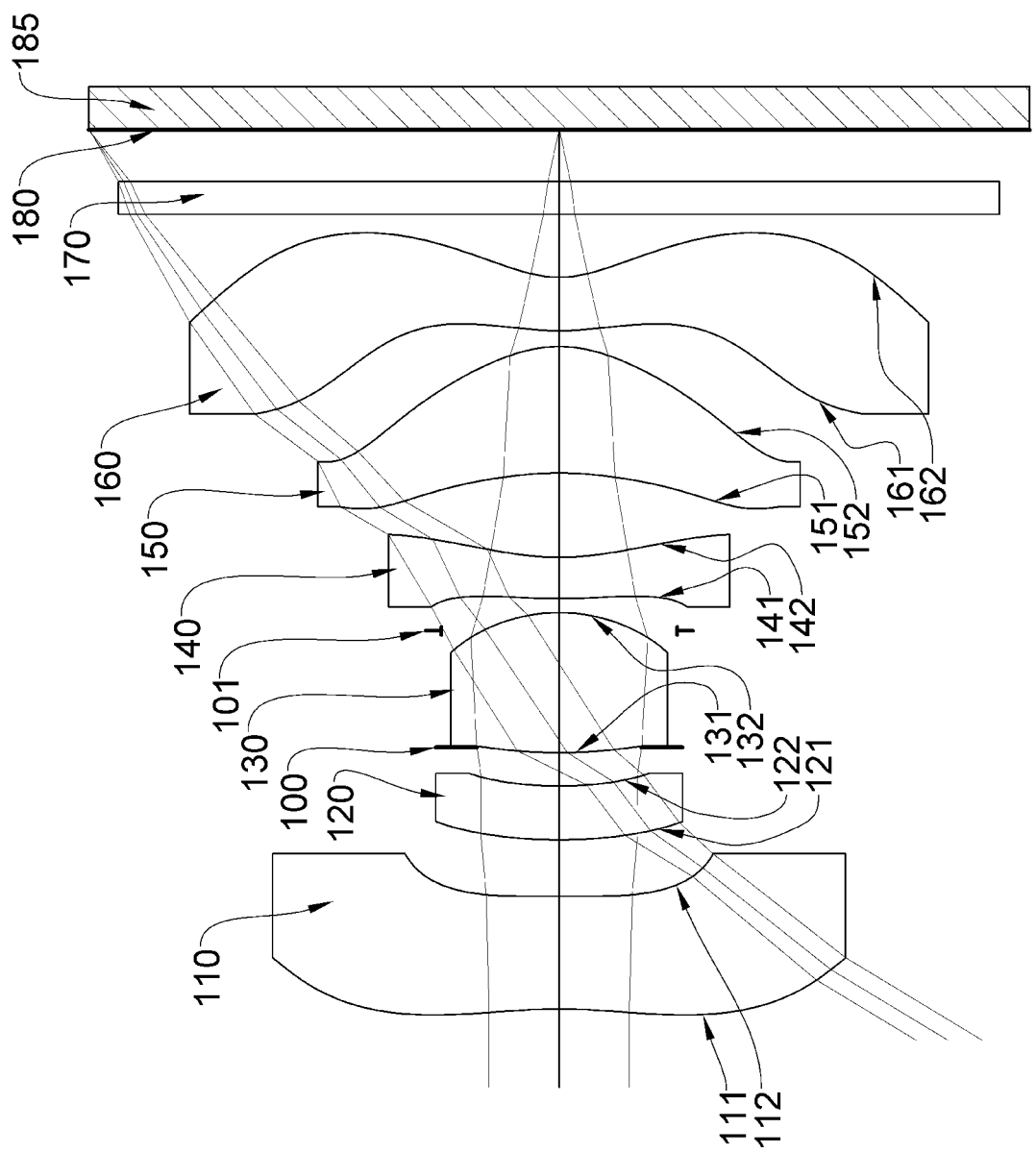
FIG. 1A is a schematic view of an imaging apparatus according to the 1st embodiment of the present disclosure.

The present disclosure provides an optical lens assembly including, in order from an object side to an image side, a first lens element, a second lens element, a third lens element, a fourth lens element, a fifth lens element, and a sixth lens element.

The first lens element has negative refractive power that allows the light of a wide view angle to enter the lens assembly. The first lens element has an object-side surface being concave in a paraxial region and has at least one convex critical point in an off-axis region of the object-side surface thereof. It is favorable for controlling the off-axis light effectively while reducing the effective radius of the first lens element and the size of the lens assembly. The first lens element may have an image-side surface being convex in a paraxial region and at least one concave critical point in an off-axis region of the image-side surface thereof, while having both the object-side surface and the image-side surface thereof being aspheric for further improving the feature of the wide view angle.

The second lens element has negative refractive power so as to balance the distribution of the negative refractive power of the lens assembly for reducing the sensitivity in manufacturing with improved yields.

The third lens element has positive refractive power so as to balance the aberrations from the first lens element and the second lens element, and reduce the total track length of the lens assembly.

The fourth lens element has negative refractive power so as to correct aberrations of the lens assembly. The fourth lens element may have an object-side surface being convex in a paraxial region and at least one concave critical point in an off-axis region of the object-side surface thereof so as to favorably correct peripheral aberrations and further improving the imaging quality.

The fifth lens element has positive refractive power so as to reduce the back focal length and the size of the lens assembly. The fifth lens element may have an object-side surface being concave in a paraxial region and an image-side surface being convex in a paraxial region so as to further correct astigmatism and improve light convergence on the image surface.

The sixth lens element has negative refractive power so as to correct Petzval sum and flatten the image surface while enhancing astigmatism corrections for avoiding image distortion. The sixth lens element may have an object-side surface being convex in a paraxial region to further correct astigmatism. The sixth lens element has an image-side surface being concave in a paraxial region, at least one convex critical point in an off-axis region of the image-side surface thereof, and both the object-side surface and the image-side surface thereof being aspheric for correcting aberrations such as field curvature in the off-axis region.

A focal length of the optical lens assembly is f, and a curvature radius of the object-side surface of the first lens element is R1. When the following condition is satisfied: f/R1<−0.40, the effective radius of the first lens element can be reduced so as to effectively reduce the size of the lens assembly for applications in various electronic devices or devices with limited space. Moreover, the following condition can be satisfied: −3.0<f/R1<−0.40. Moreover, the following condition can be satisfied: −1.50<f/R1<−0.50. Moreover, the following condition can be satisfied: −1.20<f/R1<−0.60.

A curvature radius of an object-side surface of the third lens element is R5, and a curvature radius of an image-side surface of the third lens element is R6. When the following condition is satisfied: 0<(R5+R6)/(R5−R6), the light in the peripheral region can favorably converge on the image surface.

The focal length of the optical lens assembly is f, and a focal length of the first lens element is f1, a focal length of the second lens element is f2. When the following condition is satisfied: |f/f1|+|f/f2|<0.50, it is favorable for balancing the refractive power on the object side and image side of the lens assembly so as to achieve a large angle of view and a short total length.

A maximal field of view of the optical lens assembly is FOV, an axial distance between the object-side surface of the first lens element and the image surface is TL, and a maximum image height of the optical lens assembly is ImgH (which is a half of the diagonal of the effective sensing area of the image sensor). When the following condition is satisfied: 100 degrees<FOV<180 degrees; and TL/ImgH<2.0, a compact total track length and a large angle of view can be obtained.

An Abbe number of the second lens element is V2. When the following condition is satisfied: V2<32, it is favorable for correcting chromatic aberration on the object side.

A total amount of lens elements with the Abbe number thereof being smaller than 30 is V30. When the following condition is satisfied: 3≤V30, the correction of chromatic aberration can be favorably enhanced.

The focal length of the optical lens assembly is f, the focal length of the second lens element is f2, a focal length of the fourth lens element is f4, and a focal length of the sixth lens element is f6. When the following condition is satisfied: (f2−f4−f6)/f<−3.0, it is favorable for balancing the refractive power on the object side and the image side of the lens assembly so as to achieve a large angle of view and a short total length.

A vertical distance between a maximum effective diameter position on the object-side surface of the first lens element and an optical axis is Y11, and a vertical distance between a maximum effective diameter position on the image-side surface of the sixth lens element and the optical axis is Y62. When the following condition is satisfied: Y11/Y62<1.20, the space utilization of the lens assembly can be further improved so as to avoid a poor space arrangement due to an overly large size at one side of the lens barrel for further miniaturizing the camera module.

The focal length of the optical lens assembly is f, and the focal length of the second lens element is f2. When the following condition is satisfied: f/f2<−0.05, the refractive power at the object side of the lens assembly can be favorably controlled so as to enhance the large angle of view.

The focal length of the first lens element is f1, and the curvature radius of the object-side surface of the first lens element is R1. When the following condition is satisfied: 1.0<f1/R1, the compact size of the lens assembly and the large field of view can be effectively balanced.

The curvature radius of the object-side surface of the first lens element is R1, and an axial distance between the object-side surface of the first lens element and the image-side surface of the sixth lens element is Td. When the following condition is satisfied: R1/Td≤−0.75, the size and the field of view of the lens assembly can be effectively controlled for better applications in various electronic devices.

The focal length of the first lens element is f1, and the focal length of the fourth lens element is f4. When the following condition is satisfied: 0.75<f1/f4, the refractive power at the object side and the image side of the lens assembly can be favorably balanced so as to correct aberrations and reduce the sensitivity.

An Abbe number of a lens element is V, and a refractive index of the lens element is N. When at least one lens element of the optical lens assembly satisfies the following condition: 6.0<V/N<12.5, chromatic aberration can be favorably corrected. Moreover, the following condition can be satisfied: 8.0<V/N<12.0. The present disclosure further provides an imaging apparatus, including the aforementioned optical lens assembly and an image sensor disposed on the image surface of the optical lens assembly.

The present disclosure further provides an electronic device, including at least two imaging apparatuses facing toward the same side, wherein at least one of the at least two imaging apparatuses is the aforementioned imaging apparatus, and the fields of view of the at least two imaging apparatuses differ by at least 20 degrees such that the imaging apparatuses can process multiple images in different fields of the view thereof to provide image optimization and other image processing functions. Moreover, the fields of view of the at least two imaging apparatuses can differ by at least 30 degrees. Moreover, the fields of view of the at least two imaging apparatuses can differ by at least 50 degrees. Moreover, the fields of view of the at least two imaging apparatuses can differ by at least 60 degrees.

Each of the aforementioned features of the optical lens assembly can be utilized in numerous combinations, so as to achieve the corresponding effects.

According to the optical lens assembly of the present disclosure, the critical point is a non-axial point on the surface of the lens element where a tangential plane of the point is perpendicular to the optical axis.

According to the optical lens assembly of the present disclosure, the lens elements thereof can be made of glass or plastic material. When the lens elements are made of glass material, the distribution of the refractive power of the optical lens assembly may be more flexible to design. When the lens elements are made of plastic material, the manufacturing cost can be effectively reduced. Furthermore, surfaces of each lens element can be arranged to be aspheric (ASP). Since these aspheric surfaces can be easily formed into shapes other than spherical shapes so as to have more control variables for eliminating aberrations and to further decrease the required quantity of lens elements, the total track length of the optical lens assembly can be effectively reduced.

According to the optical lens assembly of the present disclosure, if a surface of a lens element is aspheric, it means that the surface has an aspheric shape throughout its optically effective area, or a portion(s) thereof.

According to the optical lens assembly of the present disclosure, additives may be selectively added to the material of any one (or more) lens element to change the transmittance of said lens element in a particular wavelength range of light, so as to further reduce stray light and chromatic aberrations. For example, an additive that can filter off light in the wavelength range of 600-800 nm may be added to reduce extra red or infrared light, or an additive that can filter off light in the wavelength range of 350-450 nm may be added to reduce blue or ultraviolet light in the lens assembly. Thus, additives can prevent the interference caused to the image by light in a particular wavelength range. In addition, additives may be evenly mixed in the plastic material for manufacturing lens elements with an injection molding process.

According to the optical lens assembly of the present disclosure, the optical lens assembly can include at least one stop, such as an aperture stop, a glare stop or a field stop, so as to favorably reduce the amount of stray light and thereby improving the image quality.

According to the optical lens assembly of the present disclosure, an aperture stop can be configured as a front stop or a middle stop. The front stop disposed between an imaged object and the first lens element can provide a longer distance between an exit pupil of the optical lens assembly and the image surface so that the generated telecentric effect can improve the image-sensing efficiency of an image sensor, such as a CCD or CMOS sensor. The middle stop disposed between the first lens element and the image surface is favorable for enlarging the field of view of the optical lens assembly, thereby providing the optical lens assembly with the advantage of a wide-angle lens.

An aperture control unit may be disposed in the optical lens assembly of the present disclosure. The aperture control unit may be a mechanical part or optical moderation part, in which the size and shape of the aperture may be controlled by electricity or electronic signals. The mechanical part may include moving parts such as blades, shielding sheets, etc. The optical moderation part may include shielding materials such as filters, electrochromic materials, liquid crystal layers, etc. The aperture control unit can control the amount of incoming light and exposure time so as to further improve the image quality. Meanwhile, the aperture control unit may represent the aperture in the present disclosure that can adjust the image properties such as depth of field or exposure speed by changing the f-number of the lens assembly.

According to the optical lens assembly of the present disclosure, when the lens element has a convex surface and the region of convex shape is not defined, it indicates that the surface can be convex in the paraxial region thereof. When the lens element has a concave surface and the region of concave shape is not defined, it indicates that the surface can be concave in the paraxial region thereof. Likewise, when the region of refractive power or focal length of a lens element is not defined, it indicates that the region of refractive power or focal length of the lens element can be in the paraxial region thereof.

According to the optical lens assembly of the present disclosure, the image surface of the optical lens assembly, based on the corresponding image sensor, can be a plane or a curved surface with an arbitrary curvature, especially a curved surface being concave facing towards the object side. Meanwhile, the optical lens assembly of the present disclosure may optionally include one or more image correction components (such as a field flattener) between the image surface and the lens element closest to the image surface for the purpose of image corrections (such as field curvature correction). The optical properties of the image correction components such as curvatures, thicknesses, indices, positions and shapes (convex or concave, spherical or aspheric, diffractive surface and Fresnel surface, etc.) can be adjusted according to the requirement of the imaging apparatus. Preferably, an image correction component may be a thin plano-concave component having a surface being concave toward the object side and be arranged near the image surface.

According to the above description of the present disclosure, the following 1st-8th specific embodiments are provided for further explanation.

1st Embodiment

Figure 1B:
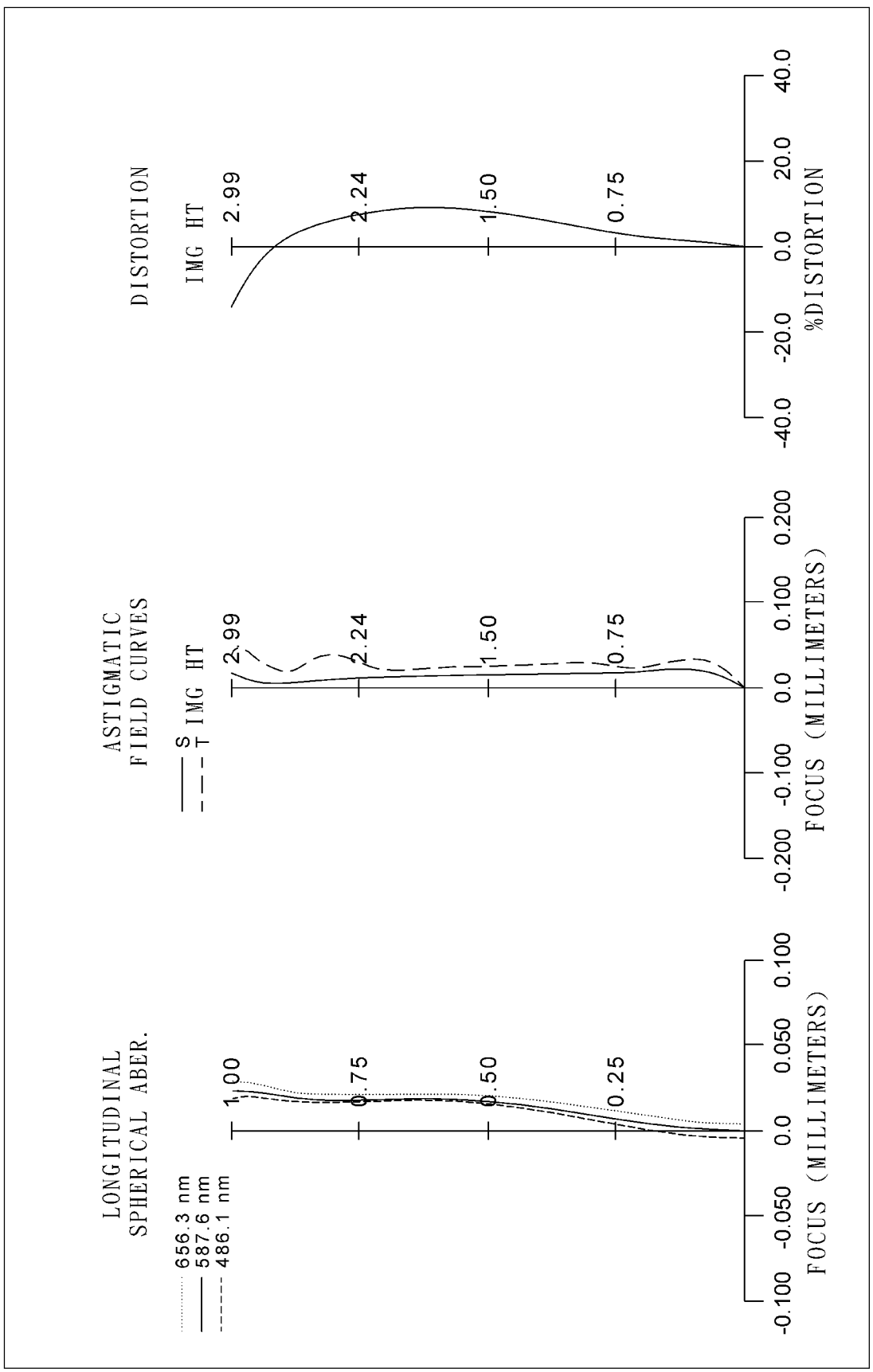
FIG. 1B shows longitudinal spherical aberration curves, astigmatic field curves and a distortion curve of the imaging apparatus according to the 1st embodiment.

FIG. 1A is a schematic view of an imaging apparatus according to the 1st embodiment of the present disclosure. FIG. 1B shows, in order from left to right, longitudinal spherical aberration curves, astigmatic field curves and a distortion curve of the imaging apparatus according to the 1st embodiment.

In FIG. 1A, the imaging apparatus includes an optical lens assembly (not otherwise herein labeled) of the present disclosure and an image sensor 185. The optical lens assembly includes, in order from an object side to an image side, a first lens element 110, a second lens element 120, an aperture stop 100, a third lens element 130, a stop 101, a fourth lens element 140, a fifth lens element 150, a sixth lens element 160, an IR cut filter 170, and an image surface 180. There is no additional lens element inserted between the first lens element 110 and the sixth lens element 160.

The first lens element 110 with negative refractive power has an object-side surface 111 being concave in a paraxial region thereof, and an image-side surface 112 being convex in a paraxial region thereof. Both the object-side surface 111 and the image-side surface 112 are aspheric, and there is at least one convex critical point in an off-axis region of the object-side surface 112. The first lens element 110 is made of plastic material.

The second lens element 120 with negative refractive power has an object-side surface 121 being convex in a paraxial region thereof, and an image-side surface 122 being concave in a paraxial region thereof. Both the object-side surface 121 and the image-side surface 122 are aspheric. The second lens element 120 is made of plastic material.

The third lens element 130 with positive refractive power has an object-side surface 131 being convex in a paraxial region thereof, and an image-side surface 132 being convex in a paraxial region thereof. Both the object-side surface 131 and the image-side surface 132 are aspheric. The third lens element 130 is made of plastic material.

The fourth lens element 140 with negative refractive power has an object-side surface 141 being convex in a paraxial region thereof, and an image-side surface 142 being concave in a paraxial region thereof. Both the object-side surface 141 and the image-side surface 142 are aspheric, and there is at least one concave critical point in an off-axis region of the object side surface 141. The fourth lens element 140 is made of plastic material.

The fifth lens element 150 with positive refractive power has an object-side surface 151 being concave in a paraxial region thereof, and an image-side surface 152 being convex in a paraxial region thereof. Both the object-side surface 151 and the image-side surface 152 are aspheric. The fifth lens element 150 is made of plastic material.

The sixth lens element 160 with negative refractive power has an object-side surface 161 being convex in a paraxial region thereof, and an image-side surface 162 being concave in a paraxial region thereof. Both the object-side surface 161 and the image-side surface 162 are aspheric, and there is at least one convex critical point in an off-axis region of the image-side surface 162. The sixth lens element 160 is made of plastic material.

The IR cut filter 170 is disposed between the sixth lens element 160 and the image surface 180. The IR cut filter 170 is made of glass material and will not affect the focal length of the optical lens assembly. The image sensor 185 is disposed on the image surface 180 of the optical lens assembly.

Figure 9:
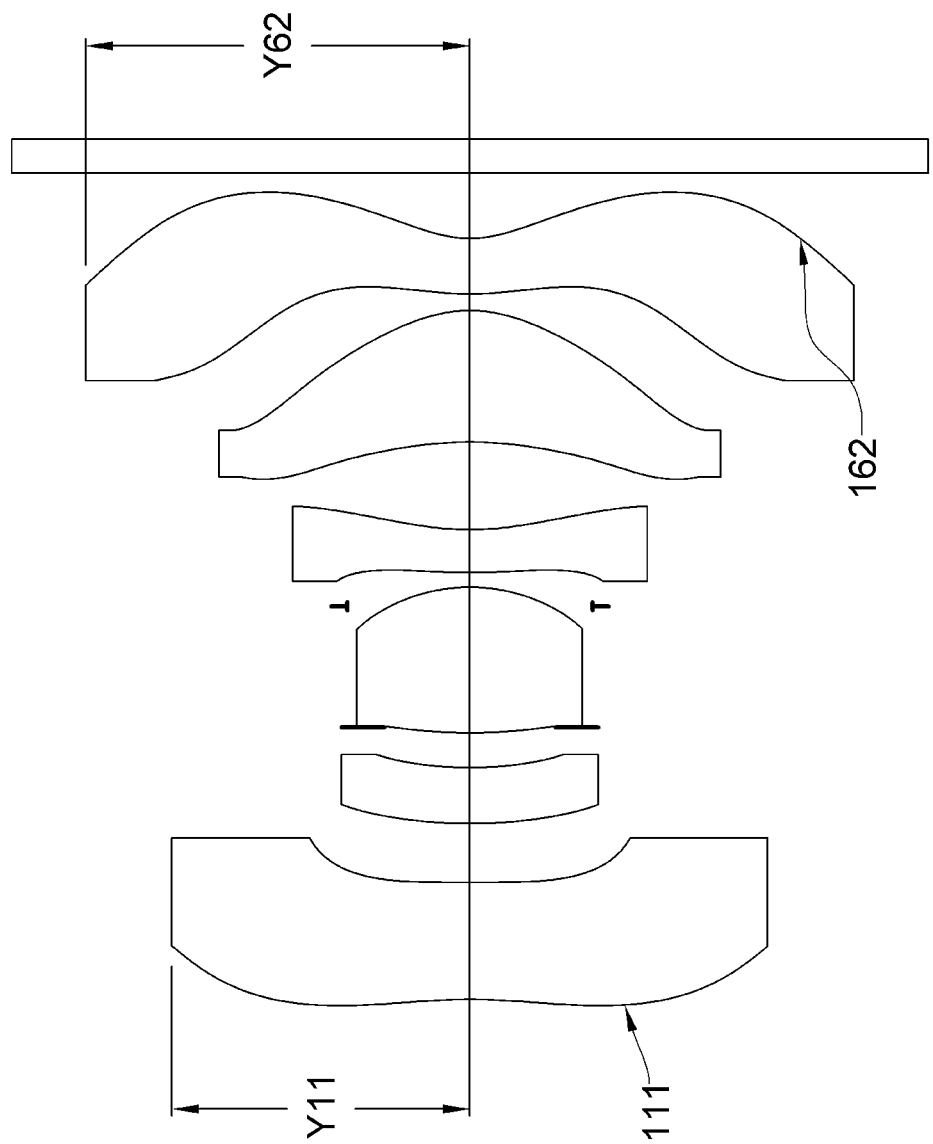
FIG. 9 is a schematic showing distances represented by the parameters Y11 and Y62 of an optical lens assembly in the embodiment 1 of the present disclosure as example.

Please refer to FIG. 9, which is a schematic view showing parameters Y11 and Y62 of the 1st embodiment of the present disclosure as an example. As shown, a vertical distance between a maximum effective diameter position on the object-side surface 111 of the first lens element 110 and an optical axis is Y11. A vertical distance between a maximum effective diameter position on the image-side surface 162 of the sixth lens element 160 and the optical axis is Y62.

The detailed optical data of the 1st embodiment are shown in TABLE 1, and the aspheric surface data are shown in TABLE 2, wherein the units of the curvature radius, the thickness and the focal length are expressed in mm, f is a focal length of the optical lens assembly, Fno is an f-number of the optical lens assembly, HFOV is a half of the maximal field of view, and surfaces #1 to #17 refer to the surfaces in order from the object side to the image side. The aspheric surface data are shown in TABLE 2, wherein k is the conic coefficient in the equation of the aspheric surface profiles, and A4-A16 refer to the 4th to 16th order aspheric coefficients.

Further, it should be noted that the tables shown in each of the following embodiments are associated with the schematic view and diagrams of longitudinal spherical aberration curves, astigmatic field curves and a distortion curve for the respective embodiment. Also, the definitions of the parameters presented in later tables are the same as those of the parameters presented in TABLE 1 and TABLE 2 for the 1st embodiment. Explanations in this regard will not be provided again.

TABLE 1

(1st Embodiment)
f = 2.10 mm, Fno = 2.35, HFOV = 58.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −3.478 | ASP | 0.717 | Plastic | 1.515 | 56.6 | −7.02 |
| 2 | | −100.000 | ASP | 0.360 | | | | |
| 3 | Lens 2 | 2.906 | ASP | 0.343 | Plastic | 1.584 | 28.2 | −23.26 |
| 4 | | 2.290 | ASP | 0.246 | | | | |
| 5 | Ape. Stop | Plano | | −0.033 | | | | |
| 6 | Lens 3 | 3.094 | ASP | 0.892 | Plastic | 1.544 | 55.9 | 1.64 |
| 7 | | −1.126 | ASP | −0.116 | | | | |
| 8 | Stop | Plano | | 0.205 | | | | |
| 9 | Lens 4 | 3.266 | ASP | 0.264 | Plastic | 1.650 | 21.4 | −5.57 |
| 10 | | 1.662 | ASP | 0.537 | | | | |
| 11 | Lens 5 | −2.200 | ASP | 0.806 | Plastic | 1.544 | 55.9 | 1.95 |
| 12 | | −0.807 | ASP | 0.101 | | | | |
| 13 | Lens 6 | 1.648 | ASP | 0.340 | Plastic | 1.607 | 26.6 | −1.97 |
| 14 | | 0.639 | ASP | 0.400 | | | | |
| 15 | IR Cut Filter | Plano | | 0.210 | Glass | 1.517 | 64.2 | — |
| 16 | | Plano | | 0.329 | | | | |
| 17 | Image Surface | Plano | | 0.000 | | | | |

Remark: Reference wavelength is d-line 587.6 nm.
* The effective radius of Surface 2 is 0.980 mm.
* The effective radius of Surface 8 (Stop) is 0.750 mm.
* The effective radius of Surface 11 is 1.390 mm.

TABLE 2

| Aspheric Coefficient | | | | | | |
|---|---|---|---|---|---|---|
| Surface # | 1 | 2 | 3 | 4 | 6 | 7 |
| k = | −5.5779E+00 | −9.0000E+01 | 1.5757E+00 | −1.3883E+01 | 1.5684E+01 | 7.5745E−02 |
| A4 = | 1.6994E−01 | 2.8603E−01 | −8.5309E−03 | 1.4528E−01 | −7.7827E−02 | −1.4830E−01 |
| A6 = | −1.1400E−01 | −8.1153E−02 | −9.8556E−02 | −2.6914E−02 | −2.4655E−01 | 5.9430E−01 |
| A8 = | 6.7831E−02 | −2.5561E−01 | 3.3903E−01 | 6.6672E−01 | 6.4331E−01 | −1.5045E+00 |
| A10 = | −2.7168E−02 | 9.2406E−01 | −1.8968E−01 | −5.4942E−01 | −2.3565E+00 | 2.2914E+00 |
| A12 = | 6.7097E−03 | −1.0560E+00 | | | | −3.6786E+00 |
| A14 = | −8.6194E−04 | 4.9829E−01 | | | | 4.3926E+00 |
| A16 = | 3.8658E−05 | | | | | −2.7756E+00 |
| Surface # | 9 | 10 | 11 | 12 | 13 | 14 |
| k = | −3.8037E+00 | −1.6639E+00 | 1.0668E+00 | −1.4161E+00 | −3.9666E+01 | −5.2577E+00 |
| A4 = | −4.7389E−01 | −2.8926E−01 | 1.5807E−01 | 2.9500E−01 | −1.4420E−01 | −1.3898E−01 |
| A6 = | 7.8552E−01 | 1.9595E−01 | −1.1769E−01 | −3.7411E−01 | −1.9017E−02 | 6.7514E−02 |
| A8 = | −1.8698E+00 | 1.9356E−01 | −7.9647E−02 | 2.5701E−01 | −8.7993E−03 | −2.6823E−02 |
| A10 = | 4.2329E+00 | −6.9351E−01 | 2.0068E−01 | −1.4091E−01 | 3.0125E−02 | 7.2638E−03 |
| A12 = | −8.1341E+00 | 7.7775E−01 | −1.0098E−01 | 7.0989E−02 | −1.2957E−02 | −1.3014E−03 |
| A14 = | 8.9452E+00 | −4.2275E−01 | 1.4715E−02 | −2.1063E−02 | 2.2141E−03 | 1.3874E−04 |
| A16 = | −4.3694E+00 | 9.3128E−02 | 7.3752E−04 | 2.4320E−03 | −1.3885E−04 | −6.4712E−06 |

The equation of the aspheric surface profiles is expressed as follows:

$$X(Y) = (Y^2/R)/(1 + sqrt(1 - (1+k)*(Y/R)^2)) + \sum_i (Ai)*(Y^i)$$

where:

X is the relative distance between a point on the aspheric surface spaced at a distance Y from the optical axis and the tangential plane at the aspheric surface vertex on the optical axis;

Y is the vertical distance from the point on the aspheric surface profile to the optical axis;

R is the curvature radius;

k is the conic coefficient; and

Ai is the i-th aspheric coefficient.

In the 1st embodiment, the focal length of the optical lens assembly is f, the f-number of the optical lens assembly is Fno, a half of the maximal field of view of the optical lens assembly is HFOV, and the maximal field of view of the optical lens assembly is FOV. These parameters have the following values: f=2.10 mm; Fno=2.35; HFOV=58.8 degrees; and FOV=117.6 degrees.

In the 1st embodiment, an Abbe number of the second lens element 120 is V2, and it satisfies the condition: V2=28.24.

In the 1st embodiment, a total amount of lens elements with the Abbe number thereof being smaller than 30 is V30, and it satisfies the condition: V30=3.

In the 1st embodiment, an Abbe number of the first lens element 110 is V1, a refractive index of the first lens element 110 is N1, and they satisfy the condition: V1/N1=37.34.

In the 1st embodiment, the Abbe number of the second lens element 120 is V2, a refractive index of the second lens element 120 is N2, and they satisfy the condition: V2/N2=17.83.

In the 1st embodiment, an Abbe number of the third lens element 130 is V3, a refractive index of the third lens element 130 is N3, and they satisfy the condition: V3/N3=36.23.

In the 1st embodiment, an Abbe number of the fourth lens element 140 is V4, a refractive index of the fourth lens element 140 is N4, and they satisfy the condition: V4/N4=12.96.

In the 1st embodiment, an Abbe number of the fifth lens element 150 is V5, a refractive index of the fifth lens element 150 is N5, and they satisfy the condition: V5/N5=36.23.

In the 1st embodiment, an Abbe number of the sixth lens element 160 is V6, a refractive index of the sixth lens element 160 is N6, and they satisfy the condition: V6/N6=16.57.

In the 1st embodiment, a curvature radius of the object-side surface 131 of the third lens element 130 is R5, a curvature radius of the image-side surface 132 of the third lens element 130 is R6, and they satisfy the condition: (R5+R6)/(R5−R6)=0.47.

In the 1st embodiment, a curvature radius of the object-side surface 111 of the first lens element 110 is R1, an axial distance between the object-side surface 111 of the first lens element 110 and the image-side surface 162 of the sixth lens element 160 is Td, and they satisfy the condition: R1/Td=−0.75.

In the 1st embodiment, a focal length of the first lens element 110 is f1, the curvature radius of the object-side surface 111 of the first lens element 110 is R1, and they satisfy the condition: f1/R1=2.02.

In the 1st embodiment, the focal length of the optical lens assembly is f, the curvature radius of the object-side surface 111 of the first lens element 110 is R1, and they satisfy the condition: f/R1=−0.60.

In the 1st embodiment, the focal length of the first lens element 110 is f1, a focal length of the fourth lens element 140 is f4, and they satisfy the condition: f1/f4=1.26.

In the 1st embodiment, the focal length of the optical lens assembly is f, a focal length of the second lens element 120 is f2, the focal length of the fourth lens element 140 is f4, a focal length of the sixth lens element 160 is f6, and they satisfy the condition: (f2−f4−f6)/f=−7.49.

In the 1st embodiment, the focal length of the optical lens assembly is f, the focal length of the first lens element 110 is f1, the focal length of the second lens element 120 is f2, and they satisfy the condition: |f/f1|+|f/f2|=0.39.

In the 1st embodiment, the focal length of the optical lens assembly is f, the focal length of the second lens element 120 is f2, and they satisfy the condition: f/f2=−0.09.

In the 1st embodiment, an axial distance between the object-side surface 111 of the first lens element 110 and the image surface 180 is TL, a maximum image height of the optical lens assembly is ImgH, and they satisfy the condition: TL/ImgH=1.87.

In the 1st embodiment, a vertical distance between a maximum effective diameter position on the object-side surface 111 of the first lens element 110 and the optical axis is Y11, a vertical distance between a maximum effective diameter position on the image-side surface 162 of the sixth lens element 160 and the optical axis is Y62, and they satisfy the condition: Y11/Y62=0.78.

2nd Embodiment

Figure 2A:
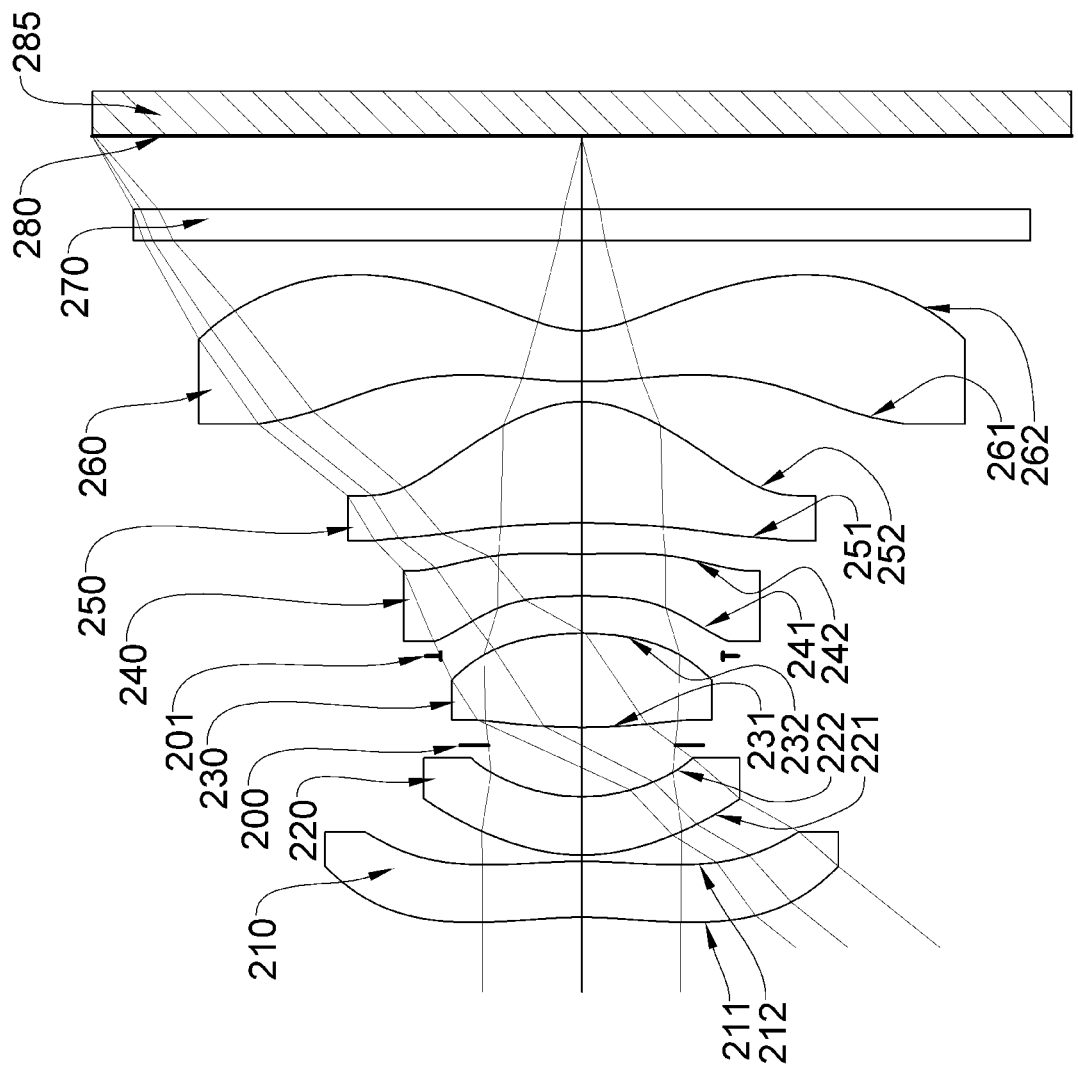
FIG. 2A is a schematic view of an imaging apparatus according to the 2nd embodiment of the present disclosure.
Figure 2B:
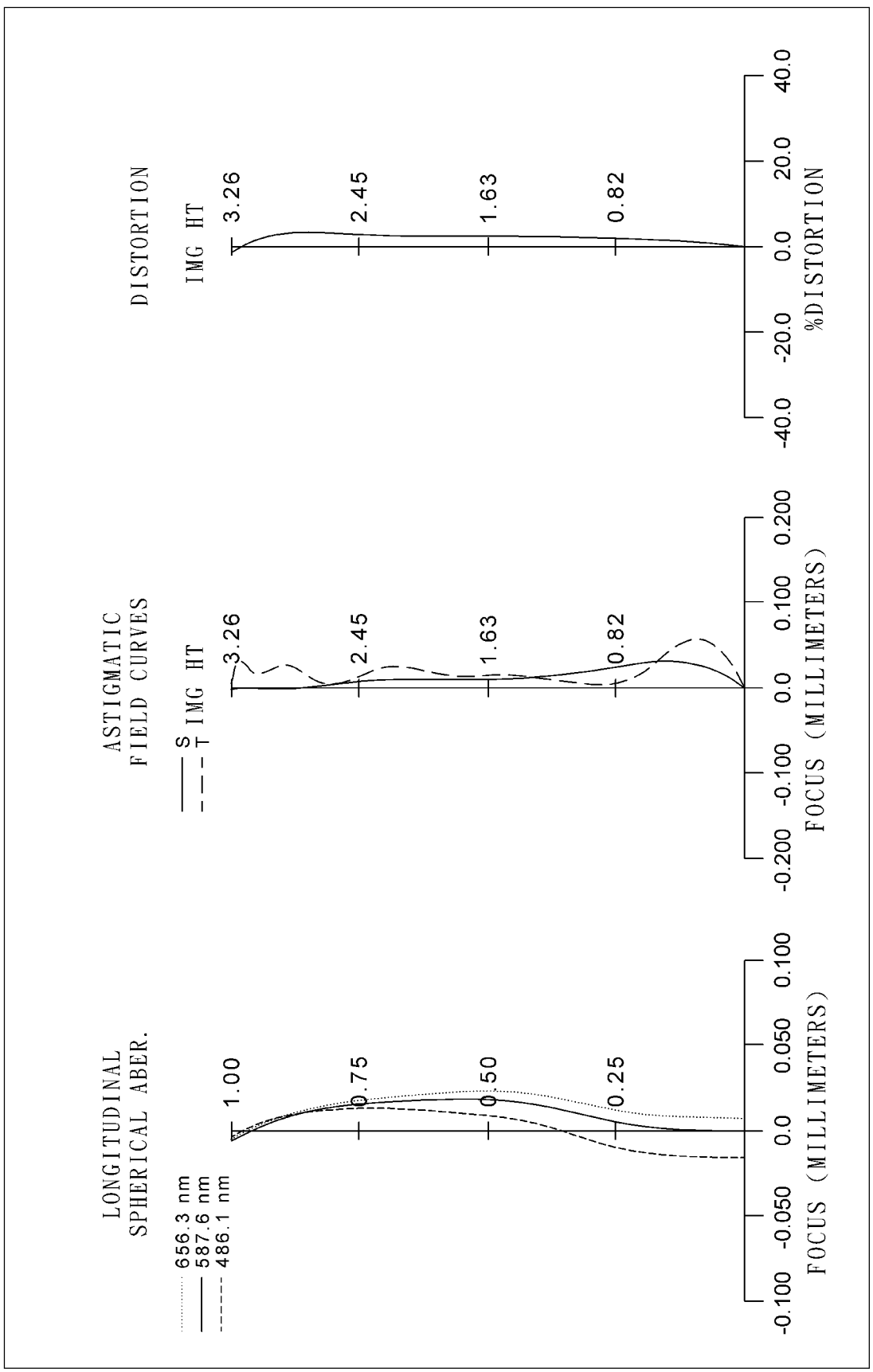
FIG. 2B shows longitudinal spherical aberration curves, astigmatic field curves and a distortion curve of the imaging apparatus according to the 2nd embodiment.

FIG. 2A is a schematic view of an imaging apparatus according to the 2nd embodiment of the present disclosure. FIG. 2B shows, in order from left to right, longitudinal spherical aberration curves, astigmatic field curves and a distortion curve of the imaging apparatus according to the 2nd embodiment.

In FIG. 2A, the imaging apparatus includes an optical lens assembly (not otherwise herein labeled) of the present disclosure and an image sensor 285. The optical lens assembly includes, in order from an object side to an image side, a first lens element 210, a second lens element 220, an aperture stop 200, a third lens element 230, a stop 201, a fourth lens element 240, a fifth lens element 250, a sixth lens element 260, an IR cut filter 270, and an image surface 280. There is no additional lens element inserted between the first lens element 210 and the sixth lens element 260.

The first lens element 210 with negative refractive power has an object-side surface 211 being concave in a paraxial region thereof, and an image-side surface 212 being convex in a paraxial region thereof. Both the object-side surface 211 and the image-side surface 212 are aspheric, and there are at least one convex critical point in an off-axis region of the object-side surface 211 and at least one concave critical point in an off-axis region of the image-side surface 212. The first lens element 210 is made of plastic material.

The second lens element 220 with negative refractive power has an object-side surface 221 being convex in a paraxial region thereof, and an image-side surface 222 being concave in a paraxial region thereof. Both the object-side surface 221 and the image-side surface 222 are aspheric. The second lens element 220 is made of plastic material.

The third lens element 230 with positive refractive power has an object-side surface 231 being convex in a paraxial region thereof, and an image-side surface 232 being convex in a paraxial region thereof. Both the object-side surface 231 and the image-side surface 232 are aspheric. The third lens element 230 is made of plastic material.

The fourth lens element 240 with negative refractive power has an object-side surface 241 being concave in a paraxial region thereof, and an image-side surface 242 being concave in a paraxial region thereof. Both the object-side surface 241 and the image-side surface 242 are aspheric. The fourth lens element 240 is made of plastic material.

The fifth lens element 250 with positive refractive power has an object-side surface 251 being concave in a paraxial region thereof, and an image-side surface 252 being convex in a paraxial region thereof. Both the object-side surface 251 and the image-side surface 252 are aspheric. The fifth lens element 250 is made of plastic material.

The sixth lens element 260 with negative refractive power has an object-side surface 261 being convex in a paraxial region thereof, and an image-side surface 262 being concave in a paraxial region thereof. Both the object-side surface 261 and the image-side surface 262 are aspheric, and there is at least one convex critical point in an off-axis region of the image-side surface 262. The sixth lens element 260 is made of plastic material.

The IR cut filter 270 is disposed between the sixth lens element 260 and the image surface 280. The IR cut filter 270 is made of glass material and will not affect the focal length of the optical lens assembly. The image sensor 285 is disposed on the image surface 280 of the optical lens assembly.

The detailed optical data of the 2nd embodiment are shown in TABLE 3, and the aspheric surface data are shown in TABLE 4.

TABLE 3

| (2nd Embodiment) f = 2.64 mm, Fno = 2.00, HFOV = 51.3 deg. | | | | | | | |
|---|---|---|---|---|---|---|---|
| Surface # | | Curvature Radius | Thickness | Material | Index | Abbe # | Focal Length |
| 0 | Object | Plano | Infinity | | | | |
| 1 | Lens 1 | −3.058 ASP | 0.373 | Plastic | 1.610 | 25.3 | −88.17 |
| 2 | | −3.392 ASP | 0.042 | | | | |
| 3 | Lens 2 | 1.312 ASP | 0.389 | Plastic | 1.645 | 20.3 | −35.27 |
| 4 | | 1.096 ASP | 0.342 | | | | |
| 5 | Ape. Stop | Plano | 0.120 | | | | |
| 6 | Lens 3 | 3.959 ASP | 0.627 | Plastic | 1.544 | 56.0 | 2.63 |
| 7 | | −2.119 ASP | −0.151 | | | | |
| 8 | Stop | Plano | 0.400 | | | | |
| 9 | Lens 4 | −5.116 ASP | 0.280 | Plastic | 1.615 | 22.1 | −4.81 |
| 10 | | 7.159 ASP | 0.206 | | | | |
| 11 | Lens 5 | −6.325 ASP | 0.811 | Plastic | 1.544 | 56.0 | 1.37 |
| 12 | | −0.698 ASP | 0.132 | | | | |
| 13 | Lens 6 | 2.709 ASP | 0.340 | Plastic | 1.544 | 56.0 | −1.62 |
| 14 | | 0.637 ASP | 0.600 | | | | |
| 15 | IR Cut Filter | Plano | 0.210 | Glass | 1.517 | 64.2 | — |
| 16 | | Plano | 0.488 | | | | |
| 17 | Image Surface | Plano | 0.000 | | | | |

Remark: Reference wavelength is d-line 587.6 nm.
* The effective radius of Surface 8 (Stop) is 0.940 mm.

TABLE 4

Aspheric Coefficient

| Surface # | 1 | 2 | 3 | 4 | 6 | 7 |
|---|---|---|---|---|---|---|
| k = | −4.9341E+01 | −9.0000E+01 | −8.6623E−01 | −1.1925E+00 | −9.9626E+00 | 2.6798E−01 |
| A4 = | 1.1706E−01 | 1.4912E−01 | 2.2735E−02 | −2.3780E−01 | −9.8256E−03 | −1.9674E−01 |
| A6 = | −6.5882E−02 | −2.0554E−01 | −6.3521E−01 | 2.2941E+00 | −1.1355E−02 | −5.7741E−01 |
| A8 = | 2.7725E−02 | 3.5319E−01 | 2.4331E+00 | −1.9606E+01 | −3.8490E−01 | 4.6380E+00 |
| A10 = | 6.3868E−03 | −4.3091E−01 | −6.0699E+00 | 1.2425E+02 | 3.0293E+00 | −2.1270E+01 |
| A12 = | −1.4431E−02 | 3.6695E−01 | 1.0421E+01 | −5.1893E+02 | −1.5375E+01 | 6.2562E+01 |
| A14 = | 8.0370E−03 | −2.0783E−01 | −1.1774E+01 | 1.4040E+03 | 4.5380E+01 | −1.1810E+02 |
| A16 = | −2.2377E−03 | 7.3360E−02 | 8.1587E+00 | −2.3580E+03 | −7.7000E+01 | 1.3792E+02 |
| A18 = | 3.0782E−04 | −1.4533E−02 | −3.0714E+00 | 2.2309E+03 | 6.9139E+01 | −9.1068E+01 |
| A20 = | −1.6097E−05 | 1.2300E−03 | 4.6769E−01 | −9.0497E+02 | −2.4879E+01 | 2.6093E+01 |

| Surface # | 9 | 10 | 11 | 12 | 13 | 14 |
|---|---|---|---|---|---|---|
| k = | −8.7157E+00 | 2.6567E+01 | 1.7161E+00 | −4.4032E+00 | −2.2430E+00 | −4.3976E+00 |
| A4 = | −7.0675E−01 | −4.7555E−01 | −5.9606E−02 | −3.4264E−01 | −2.2804E−01 | −1.3830E−01 |
| A6 = | 1.4926E+00 | 9.6873E−01 | 4.8836E−01 | 6.0112E−01 | 8.9888E−02 | 8.3073E−02 |
| A8 = | −7.2940E+00 | −2.9806E+00 | −1.7015E+00 | −7.5525E−01 | 1.2414E−02 | −3.5614E−02 |
| A10 = | 2.5288E+01 | 6.5770E+00 | 3.0839E+00 | 6.7077E−01 | −3.4419E−02 | 1.0085E−02 |
| A12 = | −5.0145E+01 | −8.6402E+00 | −3.2404E+00 | −3.7543E−01 | 1.7469E−02 | −1.9323E−03 |
| A14 = | 6.0880E+01 | 6.9252E+00 | 2.0828E+00 | 1.3540E−01 | −4.3378E−03 | 2.4723E−04 |
| A16 = | −4.5589E+01 | −3.3643E+00 | −8.1322E−01 | −3.2547E−02 | 5.6481E−04 | −1.9341E−05 |
| A18 = | 1.9545E+01 | 9.1675E−01 | 1.7773E−01 | 4.9720E−03 | −3.4835E−05 | 7.3936E−07 |
| A20 = | −3.6873E+00 | −1.0801E−01 | −1.6711E−02 | −3.6681E−04 | 6.6937E−07 | −6.1729E−09 |

In the 2nd embodiment, the equation of the aspheric surface profiles of the aforementioned lens elements is the same as the equation of the 1st embodiment. Also, the definitions of these parameters shown in table below are the same as those stated in the 1st embodiment with corresponding values for the 2nd embodiment, so an explanation in this regard will not be provided again.

Moreover, these parameters can be calculated from TABLE 3 and TABLE 4 and satisfy the conditions stated in table below.

2nd Embodiment

| | | | |
|---|---|---|---|
| f [mm] | 2.64 | V6/N6 | 36.26 |
| Fno | 2.00 | (R5 + R6)/(R5 − R6) | 0.30 |
| HFOV [deg.] | 51.3 | R1/Td | −0.78 |
| FOV [deg.] | 102.6 | f1/R1 | 28.83 |
| V2 | 20.34 | f/R1 | −0.86 |
| V30 | 3 | f1/f4 | 18.33 |
| V1/N1 | 15.74 | (f2 − f4 − f6)/f | −10.93 |
| V2/N2 | 12.36 | |f/f1| + |f/f2| | 0.10 |
| V3/N3 | 36.26 | f/f2 | −0.07 |
| V4/N4 | 13.68 | TL/ImgH | 1.60 |
| V5/N5 | 36.26 | Y11/Y62 | 0.67 |

3rd Embodiment

Figure 3A:
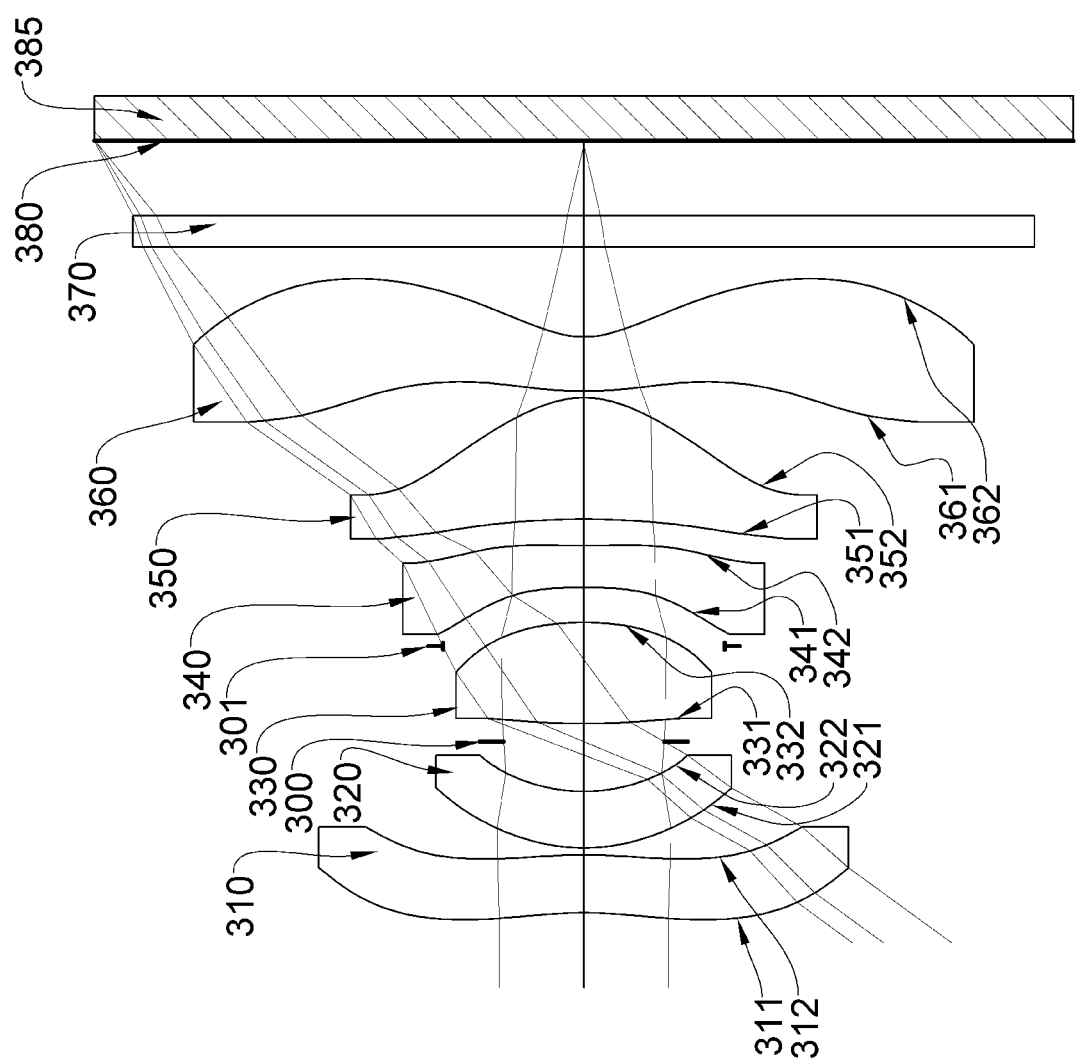
FIG. 3A is a schematic view of an imaging apparatus according to the 3rd embodiment of the present disclosure.
Figure 3B:
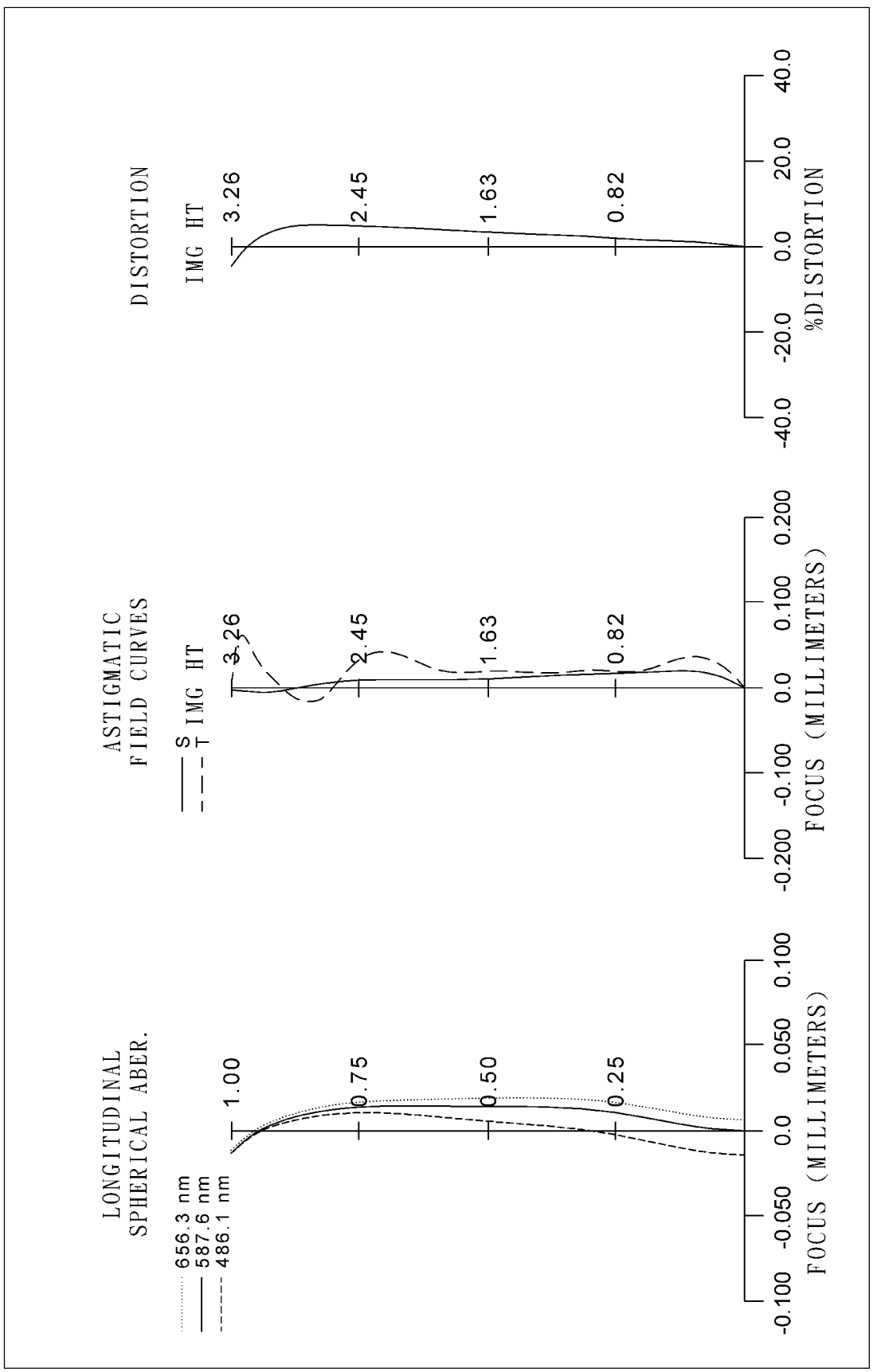
FIG. 3B shows longitudinal spherical aberration curves, astigmatic field curves and a distortion curve of the imaging apparatus according to the 3rd embodiment.

FIG. 3A is a schematic view of an imaging apparatus according to the 3rd embodiment of the present disclosure. FIG. 3B shows, in order from left to right, longitudinal spherical aberration curves, astigmatic field curves and a distortion curve of the imaging apparatus according to the 3rd embodiment.

In FIG. 3A, the imaging apparatus includes an optical lens assembly (not otherwise herein labeled) of the present disclosure and an image sensor 385. The optical lens assembly includes, in order from an object side to an image side, a first lens element 310, a second lens element 320, an aperture stop 300, a third lens element 330, a stop 301, a fourth lens element 340, a fifth lens element 350, a sixth lens element 360, an IR cut filter 370, and an image surface 380.

There is no additional lens element inserted between the first lens element 310 and the sixth lens element 360.

The first lens element 310 with negative refractive power has an object-side surface 311 being concave in a paraxial region thereof, and an image-side surface 312 being convex in a paraxial region thereof. Both the object-side surface 311 and the image-side surface 312 are aspheric, and there are at least one convex critical point in an off-axis region of the object-side surface 311 and at least one concave critical point in an off-axis region of the image-side surface 312. The first lens element 310 is made of plastic material.

The second lens element 320 with negative refractive power has an object-side surface 321 being convex in a paraxial region thereof, and an image-side surface 322 being concave in a paraxial region thereof. Both the object-side surface 321 and the image-side surface 322 are aspheric. The second lens element 320 is made of plastic material.

The third lens element 330 with positive refractive power has an object-side surface 331 being convex in a paraxial region thereof, and an image-side surface 332 being convex in a paraxial region thereof. Both the object-side surface 331 and the image-side surface 332 are aspheric. The third lens element 330 is made of plastic material.

The fourth lens element 340 with negative refractive power has an object-side surface 341 being concave in a paraxial region thereof, and an image-side surface 342 being concave in a paraxial region thereof. Both the object-side surface 341 and the image-side surface 342 are aspheric. The fourth lens element 340 is made of plastic material.

The fifth lens element 350 with positive refractive power has an object-side surface 351 being concave in a paraxial region thereof, and an image-side surface 352 being convex in a paraxial region thereof. Both the object-side surface 351 and the image-side surface 352 are aspheric. The fifth lens element 350 is made of plastic material.

The sixth lens element 360 with negative refractive power has an object-side surface 361 being convex in a paraxial region thereof, and an image-side surface 362 being concave in a paraxial region thereof. Both the object-side surface 361 and the image-side surface 362 are aspheric, and there is at least one convex critical point in an off-axis region of the image-side surface 362. The sixth lens element 360 is made of plastic material.

The IR cut filter 370 is disposed between the sixth lens element 360 and the image surface 380. The IR cut filter 370 is made of glass material and will not affect the focal length of the optical lens assembly. The image sensor 385 is disposed on the image surface 380 of the optical lens assembly.

The detailed optical data of the 3rd embodiment are shown in TABLE 5, and the aspheric surface data are shown in TABLE 6.

TABLE 5

(3rd Embodiment)
f = 2.48 mm, Fno = 2.20, HFOV = 53.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −2.642 | ASP | 0.388 | Plastic | 1.614 | 26.0 | −80.10 |
| 2 | | −2.948 | ASP | 0.046 | | | | |
| 3 | Lens 2 | 1.274 | ASP | 0.377 | Plastic | 1.634 | 21.5 | −57.68 |
| 4 | | 1.089 | ASP | 0.333 | | | | |
| 5 | Ape. Stop | Plano | | 0.120 | | | | |
| 6 | Lens 3 | 4.578 | ASP | 0.677 | Plastic | 1.544 | 56.0 | 2.59 |
| 7 | | −1.928 | ASP | −0.159 | | | | |
| 8 | Stop | Plano | | 0.392 | | | | |
| 9 | Lens 4 | −4.569 | ASP | 0.280 | Plastic | 1.627 | 20.9 | −4.44 |
| 10 | | 7.271 | ASP | 0.177 | | | | |
| 11 | Lens 5 | −5.618 | ASP | 0.813 | Plastic | 1.544 | 56.0 | 1.24 |
| 12 | | −0.632 | ASP | 0.043 | | | | |
| 13 | Lens 6 | 2.343 | ASP | 0.362 | Plastic | 1.544 | 56.0 | −1.51 |
| 14 | | 0.574 | ASP | 0.600 | | | | |
| 15 | IR Cut Filter | Plano | | 0.210 | Glass | 1.517 | 64.2 | — |
| 16 | | Plano | | 0.501 | | | | |
| 17 | Image Surface | Plano | | 0.000 | | | | |

Remark: Reference wavelength is d-line 587.6 nm.
* The effective radius of Surface 8 (Stop) is 0.940 mm.

TABLE 6

Aspheric Coefficient

| Surface # | 1 | 2 | 3 | 4 | 6 | 7 |
|---|---|---|---|---|---|---|
| k = | −3.2344E+01 | −6.8839E+01 | −5.8112E−01 | −7.6230E−01 | −1.6360E+01 | 8.2517E−01 |
| A4 = | 1.3381E−01 | 1.5692E−01 | 2.6647E−02 | −1.8636E−01 | −2.8148E−02 | −2.4067E−01 |
| A6 = | −1.2820E−01 | −2.7748E−01 | −4.1095E−01 | 1.0687E+00 | 2.9369E−01 | −1.8055E−01 |
| A8 = | 1.3365E−01 | 5.9102E−01 | 6.3293E−01 | −3.8690E+00 | −4.1436E+00 | 2.2368E+00 |
| A10 = | −1.0242E−01 | −8.2949E−01 | 2.4853E+00 | 1.5128E+01 | 2.8939E+01 | −1.1453E+01 |
| A12 = | 5.4759E−02 | 7.4915E−01 | −1.2609E+01 | −5.0458E+01 | −1.2605E+02 | 3.7246E+01 |
| A14 = | −1.9450E−02 | −4.2592E−01 | 2.5282E+01 | 1.6018E+02 | 3.3861E+02 | −7.7536E+01 |
| A16 = | 4.3790E−03 | 1.4645E−01 | −2.7317E+01 | −4.0240E+02 | −5.4657E+02 | 9.7721E+01 |
| A18 = | −5.7080E−04 | −2.7807E−02 | 1.5601E+01 | 5.9987E+02 | 4.8740E+02 | −6.8329E+01 |
| A20 = | 3.2995E−05 | 2.2393E−03 | −3.7000E+00 | −3.6941E+02 | −1.8395E+02 | 2.0557E+01 |

| Surface # | 9 | 10 | 11 | 12 | 13 | 14 |
|---|---|---|---|---|---|---|
| k = | −9.6653E+00 | 2.6176E+01 | 1.4421E+00 | −4.3031E+00 | −2.4406E+00 | −4.3899E+00 |
| A4 = | −6.5332E−01 | −4.7582E−01 | −8.2142E−02 | −3.9530E−01 | −2.0821E−01 | −1.2674E−01 |
| A6 = | 4.2210E−01 | 7.6989E−01 | 6.1193E−01 | 8.2518E−01 | 4.3897E−02 | 6.3126E−02 |
| A8 = | 4.1816E−02 | −1.8230E+00 | −2.0275E+00 | −1.3048E+00 | 5.5279E−02 | −1.9701E−02 |
| A10 = | −1.6901E+00 | 3.4561E+00 | 3.6541E+00 | 1.5309E+00 | −5.7166E−02 | 2.5585E−03 |
| A12 = | 1.1833E+01 | −3.7714E+00 | −3.9399E+00 | −1.2087E+00 | 2.5616E−02 | 3.7928E−04 |
| A14 = | −2.9569E+01 | 2.3358E+00 | 2.6517E+00 | 6.2963E−01 | −6.4255E−03 | −2.1195E−04 |
| A16 = | 3.4781E+01 | −7.9412E−01 | −1.0966E+00 | −2.0730E−01 | 9.2964E−04 | 3.6675E−05 |
| A18 = | −1.9835E+01 | 1.2885E−01 | 2.5486E−01 | 3.8801E−02 | −7.2649E−05 | −3.0296E−06 |
| A20 = | 4.4471E+00 | −6.0742E−03 | −2.5425E−02 | −3.1236E−03 | 2.3808E−06 | 9.9972E−08 |

In the 3rd embodiment, the equation of the aspheric surface profiles of the aforementioned lens elements is the same as the equation of the 1st embodiment. Also, the definitions of these parameters shown in table below are the same as those stated in the 1st embodiment with corresponding values for the 3rd embodiment, so an explanation in this regard will not be provided again.

Moreover, these parameters can be calculated from TABLE 5 and TABLE 6 and satisfy the conditions stated in table below.

| 3rd Embodiment | | | |
|---|---|---|---|
| f [mm] | 2.48 | V6/N6 | 36.26 |
| Fno | 2.20 | (R5 + R6)/(R5 − R6) | 0.41 |
| HFOV [deg.] | 53.9 | R1/Td | −0.69 |
| FOV [deg.] | 107.8 | f1/R1 | 30.32 |
| V2 | 21.54 | f/R1 | −0.94 |
| V30 | 3 | f1/f4 | 18.05 |
| V1/N1 | 16.09 | (f2 − f4 − f6)/f | −20.83 |
| V2/N2 | 13.18 | |f/f1| + |f/f2| | 0.07 |
| V3/N3 | 36.26 | f/f2 | −0.04 |
| V4/N4 | 12.84 | TL/ImgH | 1.58 |
| V5/N5 | 36.26 | Y11/Y62 | 0.68 |

4th Embodiment

Figure 4A:
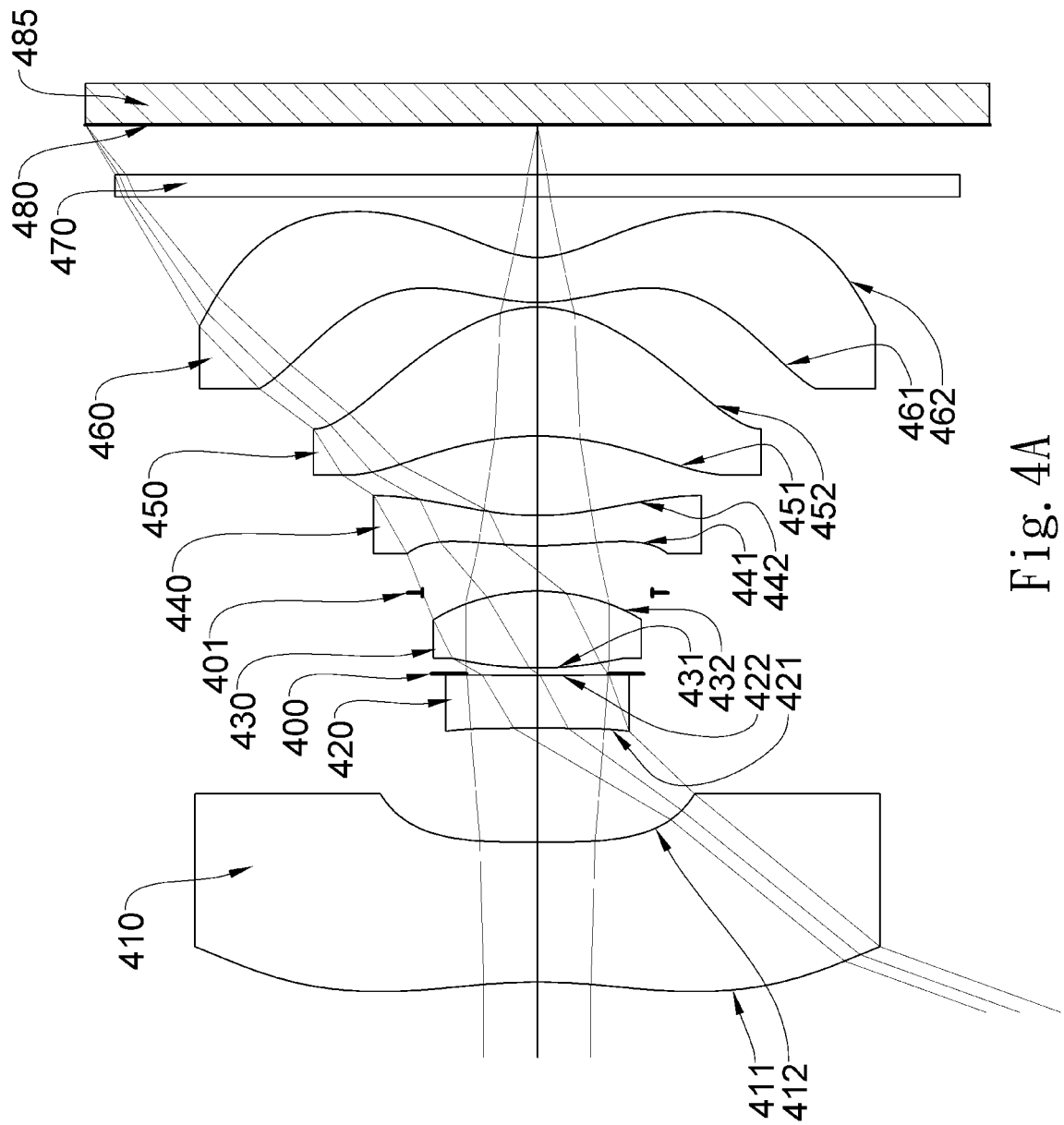
FIG. 4A is a schematic view of an imaging apparatus according to the 4th embodiment of the present disclosure.
Figure 4B:
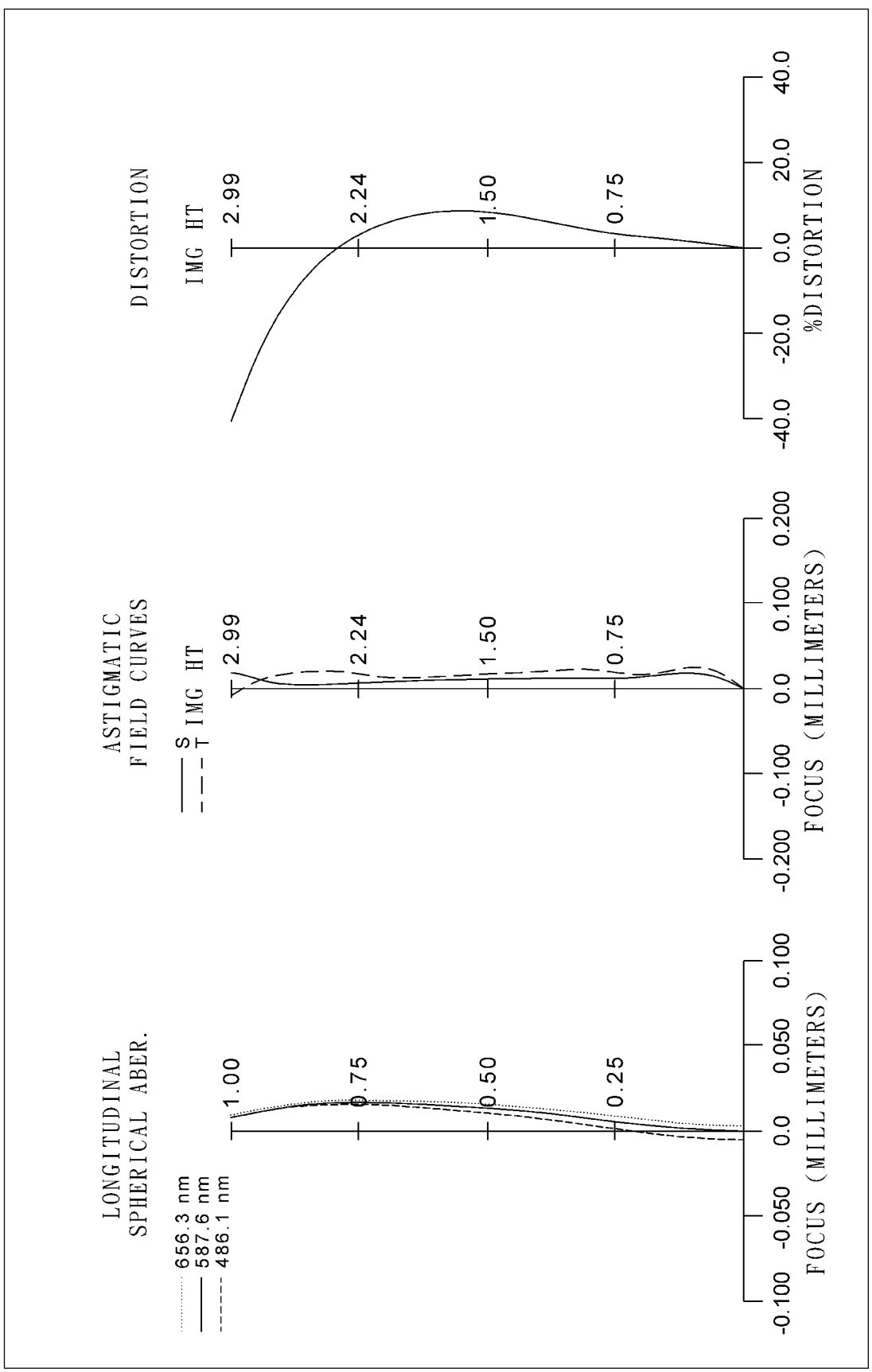
FIG. 4B shows longitudinal spherical aberration curves, astigmatic field curves and a distortion curve of the imaging apparatus according to the 4th embodiment.

FIG. 4A is a schematic view of an imaging apparatus according to the 4th embodiment of the present disclosure. FIG. 4B shows, in order from left to right, longitudinal spherical aberration curves, astigmatic field curves and a distortion curve of the imaging apparatus according to the 4th embodiment.

In FIG. 4A, the imaging apparatus includes an optical lens assembly (not otherwise herein labeled) of the present disclosure and an image sensor 485. The optical lens assembly includes, in order from an object side to an image side, a first lens element 410, a second lens element 420, an aperture stop 400, a third lens element 430, a stop 401, a fourth lens element 440, a fifth lens element 450, a sixth lens element 460, an IR cut filter 470, and an image surface 480. There is no additional lens element inserted between the first lens element 410 and the sixth lens element 460.

The first lens element 410 with negative refractive power has an object-side surface 411 being concave in a paraxial region thereof, and an image-side surface 412 being concave in a paraxial region thereof. Both the object-side surface 411 and the image-side surface 412 are aspheric, and there is at least one convex critical point in an off-axis region of the object-side surface 411. The first lens element 410 is made of plastic material.

The second lens element 420 with negative refractive power has an object-side surface 421 being planar in a paraxial region thereof, and an image-side surface 422 being concave in a paraxial region thereof. Both the object-side surface 421 and the image-side surface 422 are aspheric. The second lens element 420 is made of plastic material.

The third lens element 430 with positive refractive power has an object-side surface 431 being convex in a paraxial region thereof, and an image-side surface 432 being convex in a paraxial region thereof. Both the object-side surface 431 and the image-side surface 432 are aspheric. The third lens element 430 is made of plastic material.

The fourth lens element 440 with negative refractive power has an object-side surface 441 being convex in a paraxial region thereof, and an image-side surface 442 being concave in a paraxial region thereof. Both the object-side surface 441 and the image-side surface 442 are aspheric, and there is at least one concave critical point in an off-axis region of the object-side surface 441. The fourth lens element 440 is made of plastic material.

The fifth lens element 450 with positive refractive power has an object-side surface 451 being concave in a paraxial region thereof, and an image-side surface 452 being convex in a paraxial region thereof. Both the object-side surface 451 and the image-side surface 452 are aspheric. The fifth lens element 450 is made of plastic material.

The sixth lens element 460 with negative refractive power has an object-side surface 461 being convex in a paraxial region thereof, and an image-side surface 462 being concave in a paraxial region thereof. Both the object-side surface 461 and the image-side surface 462 are aspheric, and there is at least one convex critical point in an off-axis region of the image-side surface 462. The sixth lens element 460 is made of plastic material.

The IR cut filter 470 is located between the sixth lens element 460 and the image surface 480. The IR cut filter 470 is made of glass material and will not affect the focal length of the optical lens assembly. The image sensor 485 is disposed on the image surface 480 of the optical lens assembly.

The detailed optical data of the 4th embodiment are shown in TABLE 7, and the aspheric surface data are shown in TABLE 8.

TABLE 7

(4th Embodiment)
f = 1.82 mm, Fno = 2.56, HFOV = 70.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −3.511 | ASP | 0.926 | Plastic | 1.544 | 55.9 | −5.26 |
| 2 | | 16.916 | ASP | 0.754 | | | | |
| 3 | Lens 2 | ∞ | ASP | 0.350 | Plastic | 1.700 | 15.5 | −28.54 |
| 4 | | 19.975 | ASP | 0.012 | | | | |
| 5 | Ape. Stop | Plano | | 0.038 | | | | |
| 6 | Lens 3 | 2.493 | ASP | 0.509 | Plastic | 1.544 | 55.9 | 1.71 |
| 7 | | −1.373 | ASP | −0.010 | | | | |
| 8 | Stop | Plano | | 0.311 | | | | |
| 9 | Lens 4 | 2.731 | ASP | 0.200 | Plastic | 1.680 | 18.4 | −7.99 |
| 10 | | 1.764 | ASP | 0.527 | | | | |
| 11 | Lens 5 | −1.821 | ASP | 0.854 | Plastic | 1.544 | 55.9 | 1.81 |
| 12 | | −0.744 | ASP | 0.030 | | | | |
| 13 | Lens 6 | 1.064 | ASP | 0.300 | Plastic | 1.680 | 18.4 | −2.21 |
| 14 | | 0.552 | ASP | 0.400 | | | | |

TABLE 7-continued (4th Embodiment)
f = 1.82 mm, Fno = 2.56, HFOV = 70.1 deg.

| Surface # | | Curvature Radius | Thickness | Material | Index | Abbe # | Focal Length |
|---|---|---|---|---|---|---|---|
| 15 | IR Cut Filter | Plano | 0.145 | Glass | 1.517 | 64.2 | — |
| 16 | | Plano | 0.332 | | | | |
| 17 | Image Surface | Plano | 0.000 | | | | |

Remark: Reference wavelength is d-line 587.6 nm.
* The effective radius of Surface 8 (Stop) is 0.760 mm.

TABLE 8

Aspheric Coefficient

| Surface # | 1 | 2 | 3 | 4 | 6 | 7 |
|---|---|---|---|---|---|---|
| k = | 9.5074E−01 | −3.4437E+01 | 0.0000E+00 | −4.7177E+01 | 1.1892E+01 | −1.8273E−01 |
| A4 = | 1.2162E−01 | 1.8944E−01 | −8.3513E−02 | −1.6676E−02 | −4.8670E−02 | −1.7201E−02 |
| A6 = | −5.1569E−02 | 9.6865E−02 | −1.1921E−01 | −5.2820E−01 | −2.8318E−01 | −8.1363E−03 |
| A8 = | 2.0826E−02 | −4.2892E−01 | −7.0280E−01 | 4.1539E+00 | −3.2834E−01 | 2.2435E−01 |
| A10 = | −5.9507E−03 | 9.0747E−01 | 5.1768E+00 | −3.0567E+01 | 2.3490E+00 | −2.7800E−01 |
| A12 = | 1.1106E−03 | −9.6078E−01 | −2.0263E+01 | 1.4091E+02 | −9.0606E+00 | −3.2187E+00 |
| A14 = | −1.2033E−04 | 5.5727E−01 | 3.8147E+01 | −3.5455E+02 | 1.4826E+01 | 9.6010E+00 |
| A16 = | 5.7150E−06 | −1.2691E−01 | −2.8445E+01 | 3.7335E+02 | −1.6778E+01 | −8.8840E+00 |

| Surface # | 9 | 10 | 11 | 12 | 13 | 14 |
|---|---|---|---|---|---|---|
| k = | −3.4374E+00 | −1.3747E+00 | 4.7253E−01 | −1.3464E+00 | −1.2582E+01 | −4.2790E+00 |
| A4 = | −3.0048E−01 | −2.1804E−01 | 1.6517E−01 | 2.9056E−01 | −1.1967E−01 | −1.9157E−01 |
| A6 = | 1.4205E−01 | 6.0764E−02 | −2.5376E−01 | −4.1808E−01 | −1.5207E−01 | 1.0042E−01 |
| A8 = | −4.2311E−01 | 1.2602E−01 | 3.0934E−01 | 2.4492E−01 | 1.7853E−01 | −3.5273E−02 |
| A10 = | 1.0106E+00 | −2.2973E−01 | −1.3986E−01 | 1.0940E−02 | −9.1951E−02 | 6.8245E−03 |
| A12 = | −1.8760E+00 | 1.5099E−01 | 8.4487E−03 | −7.2512E−02 | 2.6250E−02 | −5.7957E−04 |
| A14 = | 1.6249E+00 | −3.3573E−02 | 1.3094E−02 | 3.0155E−02 | −3.8951E−03 | −1.6150E−05 |
| A16 = | −6.6162E−01 | −1.6414E−03 | −2.9315E−03 | −4.0107E−03 | 2.3280E−04 | 4.4574E−06 |

In the 4th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 4th embodiment, so an explanation in this regard will not be provided again.

Moreover, these parameters can be calculated from TABLE 7 and TABLE 8 and satisfy the conditions stated in table below.

| 4th Embodiment | | | |
|---|---|---|---|
| f [mm] | 1.82 | V6/N6 | 10.95 |
| Fno | 2.56 | (R5 + R6)/(R5 − R6) | 0.29 |
| HFOV [deg.] | 70.1 | R1/Td | −0.73 |
| FOV [deg.] | 140.2 | f1/R1 | 1.50 |
| V2 | 15.50 | f/R1 | −0.52 |
| V30 | 3 | f1/f4 | 0.66 |
| V1/N1 | 36.23 | (f2 − f4 − f6)/f | −10.09 |
| V2/N2 | 9.12 | |f/f1| + |f/f2| | 0.41 |
| V3/N3 | 36.23 | f/f2 | −0.06 |
| V4/N4 | 10.95 | TL/ImgH | 1.90 |
| V5/N5 | 36.23 | Y11/Y62 | 1.01 |

5th Embodiment

Figure 5A:
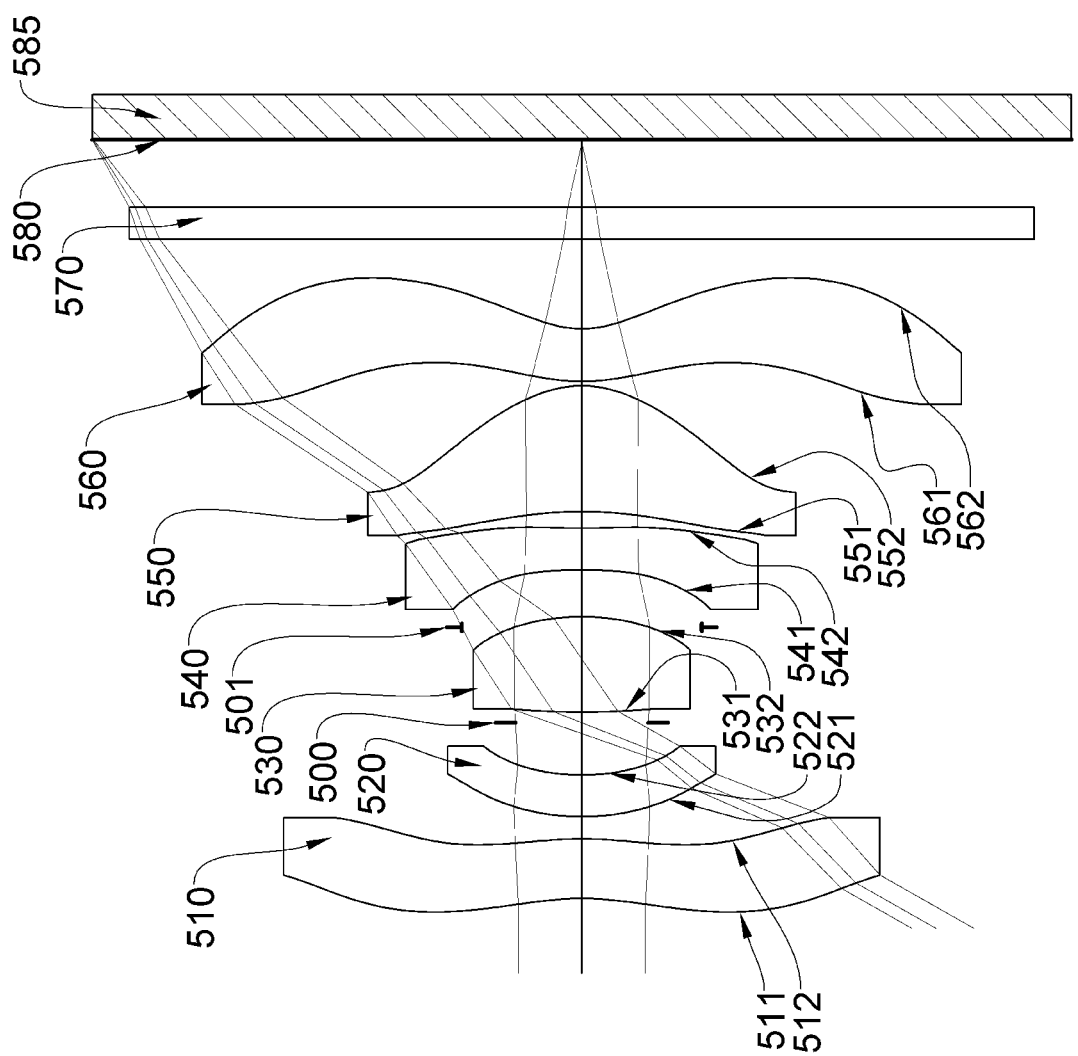
FIG. 5A is a schematic view of an imaging apparatus according to the 5th embodiment of the present disclosure.
Figure 5B:
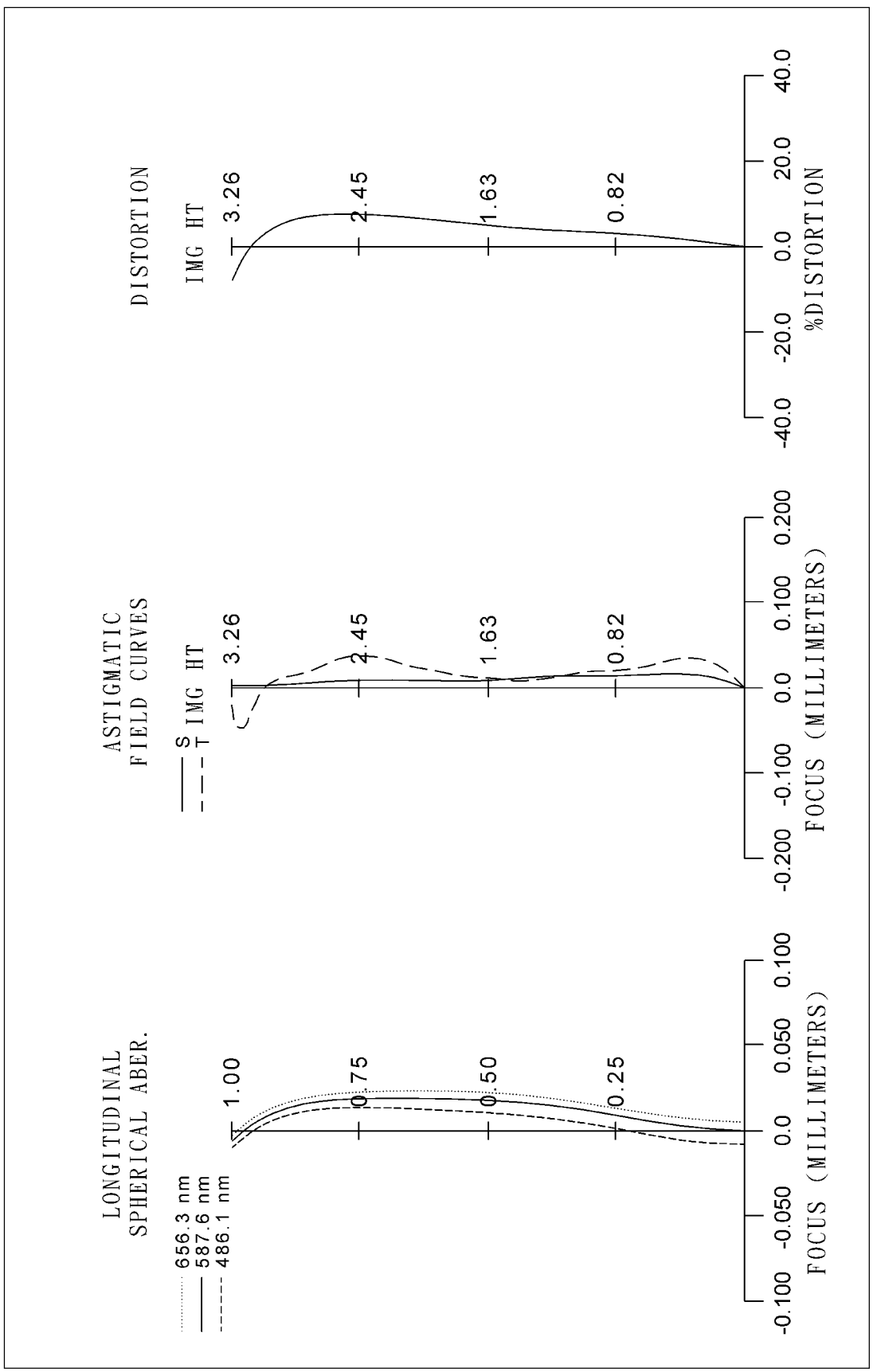
FIG. 5B shows longitudinal spherical aberration curves, astigmatic field curves and a distortion curve of the imaging apparatus according to the 5th embodiment.

FIG. 5A is a schematic view of an imaging apparatus according to the 5th embodiment of the present disclosure. FIG. 5B shows, in order from left to right, longitudinal spherical aberration curves, astigmatic field curves and a distortion curve of the imaging apparatus according to the 5th embodiment.

In FIG. 5A, the imaging apparatus includes an optical lens assembly (not otherwise herein labeled) of the present disclosure and an image sensor 585. The optical lens assembly includes, in order from an object side to an image side, a first lens element 510, a second lens element 520, an aperture stop 500, a third lens element 530, a stop 501, a fourth lens element 540, a fifth lens element 550, a sixth lens element 560, an IR cut filter 570, and an image surface 580. There is no additional lens element inserted between the first lens element 510 and the sixth lens element 560.

The first lens element 510 with negative refractive power has an object-side surface 511 being concave in a paraxial region thereof, and an image-side surface 512 being convex in a paraxial region thereof. Both the object-side surface 511 and the image-side surface 512 are aspheric, and there are at least one convex critical point in an off-axis region of the object-side surface 511 and at least one concave critical point in an off-axis region of the image-side surface 512. The first lens element 510 is made of plastic material.

The second lens element 520 with negative refractive power has an object-side surface 521 being convex in a paraxial region thereof, and an image-side surface 522 being concave in a paraxial region thereof. Both the object-side surface 521 and the image-side surface 522 are aspheric. The second lens element 520 is made of plastic material.

The third lens element 530 with positive refractive power has an object-side surface 531 being convex in a paraxial region thereof, and an image-side surface 532 being convex in a paraxial region thereof. Both the object-side surface 531 and the image-side surface 532 are aspheric. The third lens element 530 is made of plastic material.

The fourth lens element 540 with negative refractive power has an object-side surface 541 being concave in a paraxial region thereof, and an image-side surface 542 being concave in a paraxial region thereof. Both the object-side surface 541 and the image-side surface 542 are aspheric. The fourth lens element 540 is made of plastic material.

The fifth lens element 550 with positive refractive power has an object-side surface 551 being concave in a paraxial region thereof, and an image-side surface 552 being convex in a paraxial region thereof. Both the object-side surface 551 and the image-side surface 552 are aspheric. The fifth lens element 550 is made of plastic material.

The sixth lens element 560 with negative refractive power has an object-side surface 561 being convex in a paraxial region thereof, and an image-side surface 562 being concave in a paraxial region thereof. Both the object-side surface 561 and the image-side surface 562 are aspheric, and there is at least one convex critical point in an off-axis region of the image-side surface 562. The sixth lens element 560 is made of plastic material.

The IR cut filter 570 is disposed between the sixth lens element 560 and the image surface 580. The IR cut filter 570 is made of glass material and will not affect the focal length of the optical lens assembly. The image sensor 585 is disposed on the image surface 580 of the optical lens assembly.

The detailed optical data of the 5th embodiment are shown in TABLE 9, and the aspheric surface data are shown in TABLE 10.

TABLE 9

(5th Embodiment)
f = 1.99 mm, Fno = 2.35, HFOV = 60.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −1.836 | ASP | 0.398 | Plastic | 1.600 | 60.0 | −21.42 |
| 2 | | −2.317 | ASP | 0.148 | | | | |
| 3 | Lens 2 | 1.561 | ASP | 0.278 | Plastic | 1.653 | 22.7 | −46.90 |
| 4 | | 1.381 | ASP | 0.349 | | | | |
| 5 | Ape. Stop | Plano | | 0.071 | | | | |
| 6 | Lens 3 | 5.072 | ASP | 0.637 | Plastic | 1.605 | 43.7 | 2.13 |
| 7 | | −1.644 | ASP | −0.070 | | | | |
| 8 | Stop | Plano | | 0.382 | | | | |
| 9 | Lens 4 | −4.790 | ASP | 0.280 | Plastic | 1.767 | 17.7 | −3.30 |
| 10 | | 5.514 | ASP | 0.111 | | | | |
| 11 | Lens 5 | −2.566 | ASP | 0.840 | Plastic | 1.600 | 60.0 | 1.38 |
| 12 | | −0.704 | ASP | 0.030 | | | | |
| 13 | Lens 6 | 1.349 | ASP | 0.350 | Plastic | 1.600 | 60.0 | −2.45 |
| 14 | | 0.635 | ASP | 0.600 | | | | |
| 15 | IR Cut Filter | Plano | | 0.210 | Glass | 1.517 | 64.2 | — |
| 16 | | Plano | | 0.453 | | | | |
| 17 | Image Surface | Plano | | 0.000 | | | | |

Remark: Reference wavelength is d-line 587.6 nm.
* The effective radius of Surface 2 is 1.650 mm.
* The effective radius of Surface 8 (Stop) is 0.800 mm.

TABLE 10

Aspheric Coefficient

| Surface # | 1 | 2 | 3 | 4 | 6 | 7 |
|---|---|---|---|---|---|---|
| k = | −2.1482E+01 | −5.5902E+01 | 1.3607E−01 | 8.1099E−01 | −4.2853E+01 | −2.9508E−01 |
| A4 = | 6.6175E−02 | 6.6944E−02 | 4.9119E−02 | −9.5955E−02 | 3.5967E−02 | −1.9165E−01 |
| A6 = | −4.9954E−03 | 7.8617E−02 | −5.7873E−01 | 1.6060E−01 | −2.6116E−01 | 2.4083E−01 |
| A8 = | −4.9673E−03 | −8.4822E−02 | 3.0726E+00 | 5.1412E+00 | 2.1296E+00 | −7.6696E−01 |
| A10 = | 2.5917E−03 | 3.1727E−02 | −6.4079E+00 | −2.4310E+01 | −1.2428E+01 | 1.1209E+00 |
| A12 = | −5.7106E−04 | −5.5874E−03 | 5.8099E+00 | 4.3825E+01 | 3.2325E+01 | −1.4061E+00 |
| A14 = | 4.5015E−05 | 3.9210E−04 | −1.9846E+00 | −2.6680E+01 | −3.2907E+01 | 4.5552E−01 |

| Surface # | 9 | 10 | 11 | 12 | 13 | 14 |
|---|---|---|---|---|---|---|
| k = | 1.3107E+01 | −6.6079E+01 | −1.0821E+01 | −4.0062E+00 | −4.1800E+00 | −4.0965E+00 |
| A4 = | −6.1539E−01 | −4.1615E−01 | 5.1781E−02 | −4.6117E−01 | −2.7915E−01 | −1.7020E−01 |
| A6 = | 3.1332E−01 | 5.2004E−01 | −1.4401E−01 | 6.7457E−01 | 1.9011E−01 | 9.5565E−02 |
| A8 = | 2.3062E+00 | −2.7208E−01 | 2.3120E−01 | −6.3875E−01 | −8.4581E−02 | −3.5007E−02 |
| A10 = | −7.9566E+00 | −3.6612E−02 | −1.7934E−01 | 4.0498E−01 | 2.3332E−02 | 7.7717E−03 |
| A12 = | 1.2953E+01 | 1.7669E−01 | 9.3067E−02 | −1.3842E−01 | −3.7431E−03 | −1.0148E−03 |
| A14 = | −1.1336E+01 | −1.2803E−01 | −3.5239E−02 | 2.1087E−02 | 3.2044E−04 | 7.0776E−05 |
| A16 = | 4.0177E+00 | 3.0996E−02 | 5.9258E−03 | −8.8940E−04 | −1.1347E−05 | −1.9879E−06 |

In the 5th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 5th embodiment, so an explanation in this regard will not be provided again.

Moreover, these parameters can be calculated from TABLE 9 and TABLE 10 and satisfy the conditions stated in table below.

| 5th Embodiment | | | |
|---|---|---|---|
| f [mm] | 1.99 | V6/N6 | 37.50 |
| Fno | 2.35 | (R5 + R6)/(R5 − R6) | 0.51 |
| HFOV [deg.] | 60.4 | R1/Td | −0.48 |
| FOV [deg.] | 121.0 | f1/R1 | 11.66 |
| V2 | 22.65 | f/R1 | −1.08 |
| V30 | 2 | f1/f4 | 6.48 |
| V1/N1 | 37.50 | (f2 − f4 − f6)/f | −20.65 |
| V2/N2 | 13.70 | \|f/f1\| + \|f/f2\| | 0.14 |
| V3/N3 | 27.25 | f/f2 | −0.04 |
| V4/N4 | 10.01 | TL/ImgH | 1.55 |
| V5/N5 | 37.50 | Y11/Y62 | 0.79 |

6th Embodiment

Figure 6A:
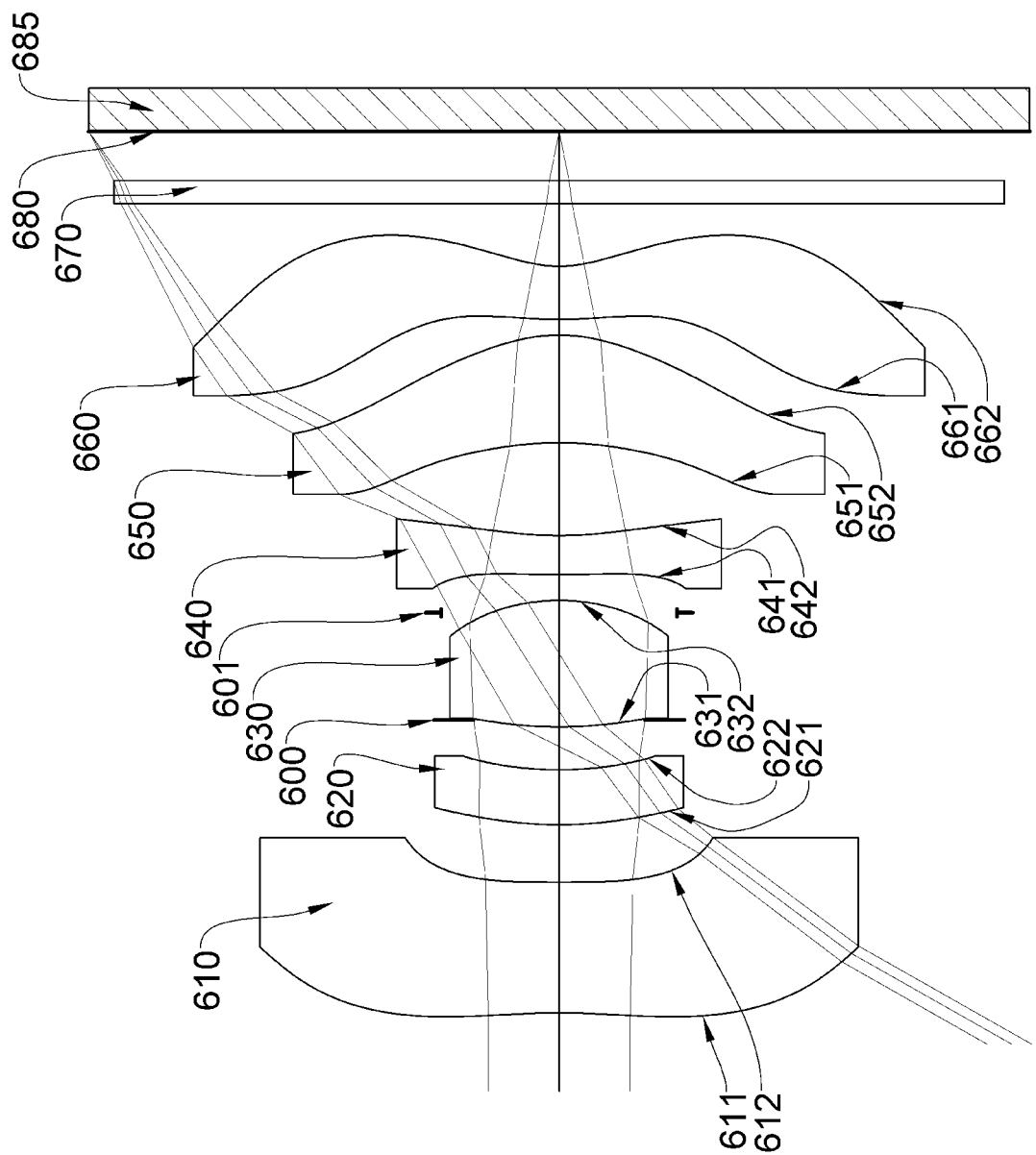
FIG. 6A is a schematic view of an imaging apparatus according to the 6th embodiment of the present disclosure.
Figure 6B:
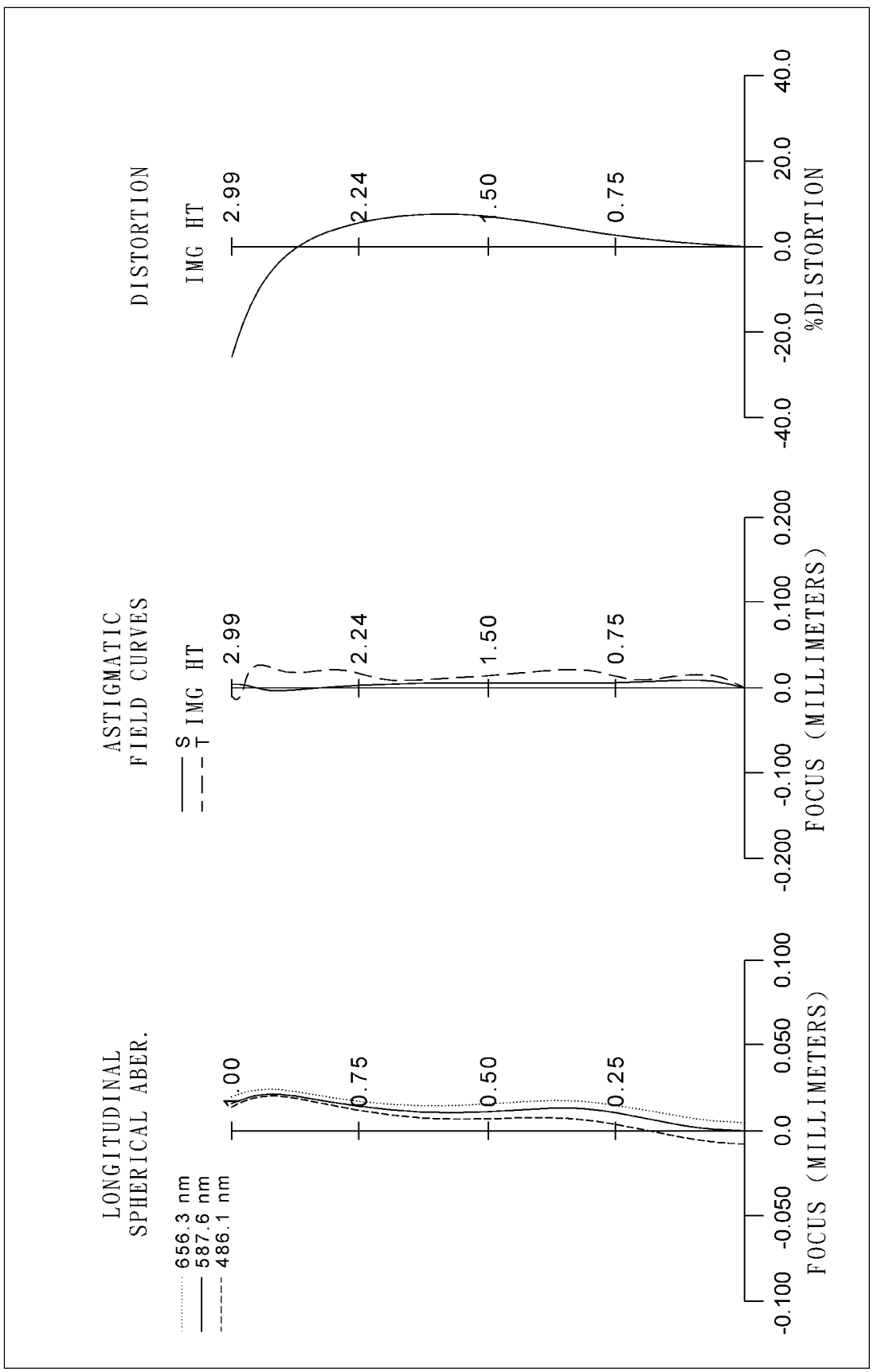
FIG. 6B shows longitudinal spherical aberration curves, astigmatic field curves and a distortion curve of the imaging apparatus according to the 6th embodiment.

FIG. 6A is a schematic view of an imaging apparatus according to the 6th embodiment of the present disclosure. FIG. 6B shows, in order from left to right, longitudinal spherical aberration curves, astigmatic field curves and a distortion curve of the imaging apparatus according to the 6th embodiment.

In FIG. 6A, the imaging apparatus includes an optical lens assembly (not otherwise herein labeled) of the present disclosure and an image sensor 685. The optical lens assembly includes, in order from an object side to an image side, a first lens element 610, a second lens element 620, an aperture stop 600, a third lens element 630, a stop 601, a fourth lens element 640, a fifth lens element 650, a sixth lens element 660, an IR cut filter 670, and an image surface 680. There is no additional lens element inserted between the first lens element 610 and the sixth lens element 660.

The first lens element 610 with negative refractive power has an object-side surface 611 being concave in a paraxial region thereof, and an image-side surface 612 being concave in a paraxial region thereof. Both the object-side surface 611 and the image-side surface 612 are aspheric and there is at least one convex critical point in an off-axis region of the object-side surface 611. The first lens element 610 is made of plastic material.

The second lens element 620 with negative refractive power has an object-side surface 621 being convex in a paraxial region thereof, and an image-side surface 622 being concave in a paraxial region thereof. Both the object-side surface 621 and the image-side surface 622 are aspheric. The second lens element 620 is made of plastic material.

The third lens element 630 with positive refractive power has an object-side surface 631 being convex in a paraxial region thereof, and an image-side surface 632 being convex in a paraxial region thereof. Both the object-side surface 631 and the image-side surface 632 are aspheric. The third lens element 630 is made of plastic material.

The fourth lens element 640 with negative refractive power has an object-side surface 641 being convex in a paraxial region thereof, and an image-side surface 642 being concave in a paraxial region thereof. Both the object-side surface 641 and the image-side surface 642 are aspheric, and there is at least one concave critical point in an off-axis region of the object-side surface 641. The fourth lens element 640 is made of plastic material.

The fifth lens element 650 with positive refractive power has an object-side surface 651 being concave in a paraxial region thereof, and an image-side surface 652 being convex in a paraxial region thereof. Both the object-side surface 651 and the image-side surface 652 are aspheric. The fifth lens element 650 is made of plastic material.

The sixth lens element 660 with negative refractive power has an object-side surface 661 being convex in a paraxial region thereof, and an image-side surface 662 being concave in a paraxial region thereof. Both the object-side surface 661 and the image-side surface 662 are aspheric, and there is at least one convex critical point in an off-axis region of the image-side surface 662. The sixth lens element 660 is made of plastic material.

The IR cut filter 670 is disposed between the sixth lens element 660 and the image surface 680. The IR cut filter 670 is made of glass material and will not affect the focal length of the optical lens assembly. The image sensor 685 is disposed on the image surface 680 of the optical lens assembly.

The detailed optical data of the 6th embodiment are shown in TABLE 11, and the aspheric surface data are shown in TABLE 12.

TABLE 11

(6th Embodiment)
f = 2.28 mm, Fno = 2.52, HFOV = 60.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −4.550 | ASP | 0.832 | Plastic | 1.600 | 60.0 | −6.07 |
| 2 | | 19.450 | ASP | 0.366 | | | | |
| 3 | Lens 2 | 2.465 | ASP | 0.350 | Plastic | 1.700 | 15.5 | −37.22 |
| 4 | | 2.121 | ASP | 0.317 | | | | |
| 5 | Ape. Stop | Plano | | −0.043 | | | | |
| 6 | Lens 3 | 2.624 | ASP | 0.806 | Plastic | 1.600 | 60.0 | 1.59 |
| 7 | | −1.320 | ASP | −0.079 | | | | |
| 8 | Stop | Plano | | 0.242 | | | | |
| 9 | Lens 4 | 4.745 | ASP | 0.250 | Plastic | 1.656 | 22.2 | −6.56 |
| 10 | | 2.210 | ASP | 0.592 | | | | |
| 11 | Lens 5 | −2.139 | ASP | 0.686 | Plastic | 1.600 | 60.0 | 2.60 |
| 12 | | −1.010 | ASP | 0.099 | | | | |
| 13 | Lens 6 | 2.209 | ASP | 0.340 | Plastic | 1.612 | 42.6 | −2.07 |
| 14 | | 0.759 | ASP | 0.400 | | | | |

TABLE 11-continued (6th Embodiment)
f = 2.28 mm, Fno = 2.52, HFOV = 60.4 deg.

| Surface # | | Curvature Radius | Thickness | Material | Index | Abbe # | Focal Length |
|---|---|---|---|---|---|---|---|
| 15 | IR Cut Filter | Plano | 0.145 | Glass | 1.517 | 64.2 | — |
| 16 | | Plano | 0.314 | | | | |
| 17 | Image Surface | Plano | 0.000 | | | | |

Remark: Reference wavelength is d-line 587.6 nm.
* The effective radius of Surface 2 is 0.980 mm.
* The effective radius of Surface 8 (Stop) is 0.750 mm.
* The effective radius of Surface 11 is 1.400 mm.

TABLE 12

Aspheric Coefficient

| Surface # | 1 | 2 | 3 | 4 | 6 | 7 |
|---|---|---|---|---|---|---|
| k = | −2.7474E+00 | −5.4214E+00 | −3.7209E+00 | −1.8275E+01 | 1.1649E+01 | 3.3861E−01 |
| A4 = | 1.5240E−01 | 2.6852E−01 | 7.0961E−03 | 1.9951E−01 | −1.3269E−01 | −1.6260E−01 |
| A6 = | −9.0978E−02 | −1.6184E−02 | −2.6836E−01 | −1.0300E+00 | 3.1114E−01 | 3.3635E−01 |
| A8 = | 5.0513E−02 | −5.1073E−01 | 7.4342E−01 | 7.0065E+00 | −5.0814E+00 | −1.3006E−01 |
| A10 = | −1.9346E−02 | 1.6336E+00 | −1.2341E+00 | −3.0910E+01 | 3.1114E+01 | −2.5214E+00 |
| A12 = | 4.6831E−03 | −2.2620E+00 | 1.8636E+00 | 8.9576E+01 | −1.1530E+02 | 7.5075E+00 |
| A14 = | −6.1180E−04 | 1.5964E+00 | −1.9939E+00 | −1.4478E+02 | 2.2255E+02 | −9.8742E+00 |
| A16 = | 3.0680E−05 | −4.1634E−01 | 9.2563E−01 | 9.9733E+01 | −1.7955E+02 | 4.8450E+00 |

| Surface # | 9 | 10 | 11 | 12 | 13 | 14 |
|---|---|---|---|---|---|---|
| k = | −1.7222E+01 | −5.6112E−01 | 1.0308E+00 | −1.5441E+00 | −7.3727E+01 | −6.8451E+00 |
| A4 = | −4.8592E−01 | −3.0662E−01 | 1.8684E−01 | 3.2431E−01 | −2.0677E−01 | −1.7300E−01 |
| A6 = | 7.1379E−01 | 3.3621E−01 | −3.5907E−01 | −5.0920E−01 | −4.0899E−02 | 9.6918E−02 |
| A8 = | −1.3800E+00 | −2.2873E−01 | 4.9478E−01 | 4.7195E−01 | 1.0516E−01 | −4.1949E−02 |
| A10 = | 2.2351E+00 | 1.2704E−01 | −5.0815E−01 | −2.5713E−01 | −4.6957E−02 | 1.2157E−02 |
| A12 = | −3.2577E+00 | −1.3184E−01 | 3.5210E−01 | 8.3760E−02 | 9.9533E−03 | −2.3060E−03 |
| A14 = | 2.4785E+00 | 1.0785E−01 | −1.2886E−01 | −1.5209E−02 | −1.0590E−03 | 2.5680E−04 |
| A16 = | −9.1583E−01 | −3.2110E−02 | 1.8750E−02 | 1.1876E−03 | 4.5519E−05 | −1.2351E−05 |

In the 6th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 6th embodiment, so an explanation in this regard will not be provided again.

Moreover, these parameters can be calculated from TABLE 11 and TABLE 12 and satisfy the conditions stated in table below.

| 6th Embodiment | | | |
|---|---|---|---|
| f [mm] | 2.28 | V6/N6 | 26.44 |
| Fno | 2.52 | (R5 + R6)/(R5 − R6) | 0.33 |
| HFOV [deg.] | 60.4 | R1/Td | −0.96 |
| FOV [deg.] | 120.8 | f1/R1 | 1.33 |
| V2 | 15.50 | f/R1 | −0.50 |
| V30 | 2 | f1/f4 | 0.92 |
| V1/N1 | 37.50 | (f2 − f4 − f6)/f | −12.55 |
| V2/N2 | 9.12 | |f/f1| + |f/f2| | 0.44 |
| V3/N3 | 37.50 | f/f2 | −0.06 |
| V4/N4 | 13.39 | TL/ImgH | 1.88 |
| V5/N5 | 37.50 | Y11/Y62 | 0.82 |

7th Embodiment

Figure 7A:
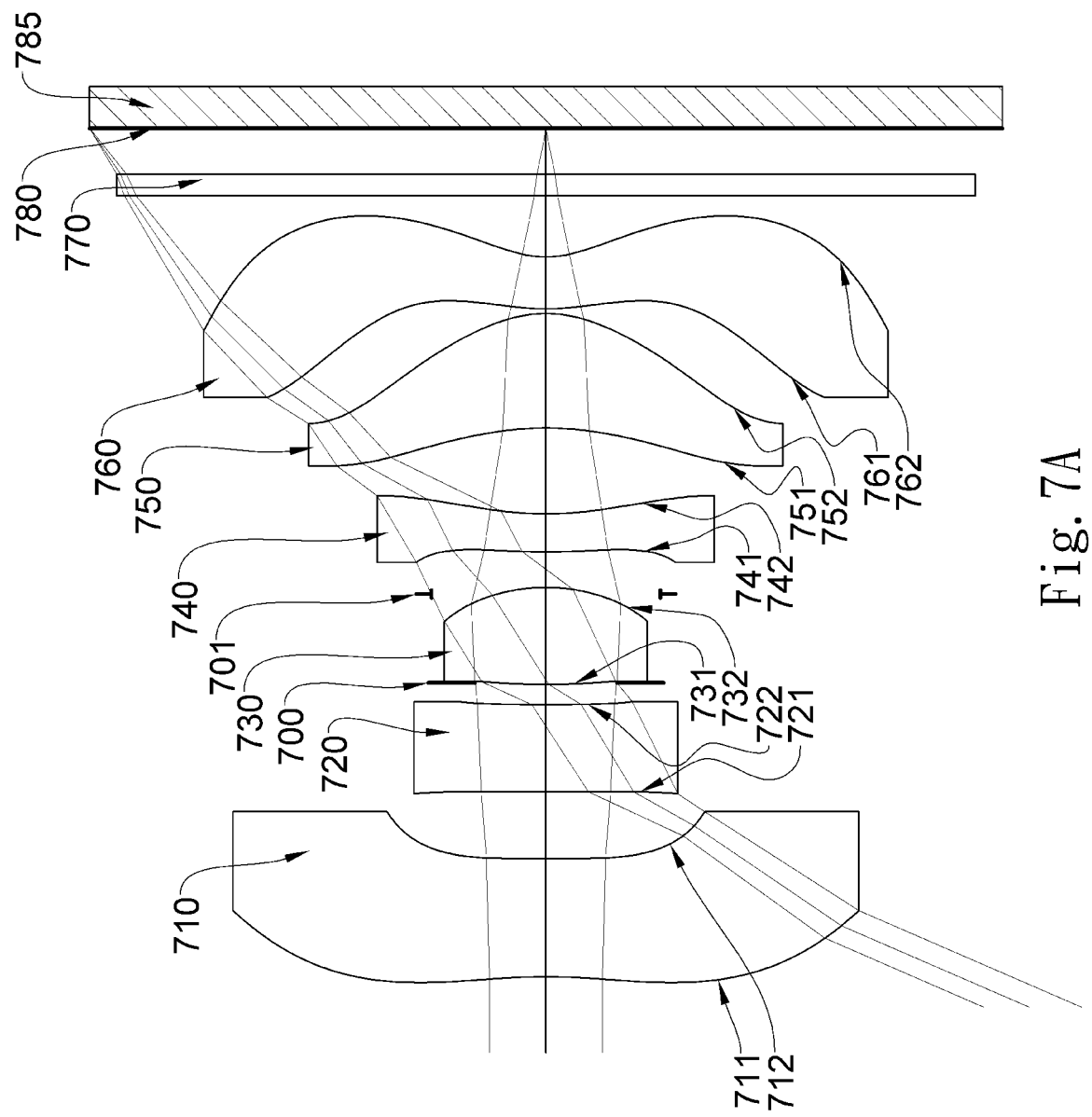
FIG. 7A is a schematic view of an imaging apparatus according to the 7th embodiment of the present disclosure.
Figure 7B:
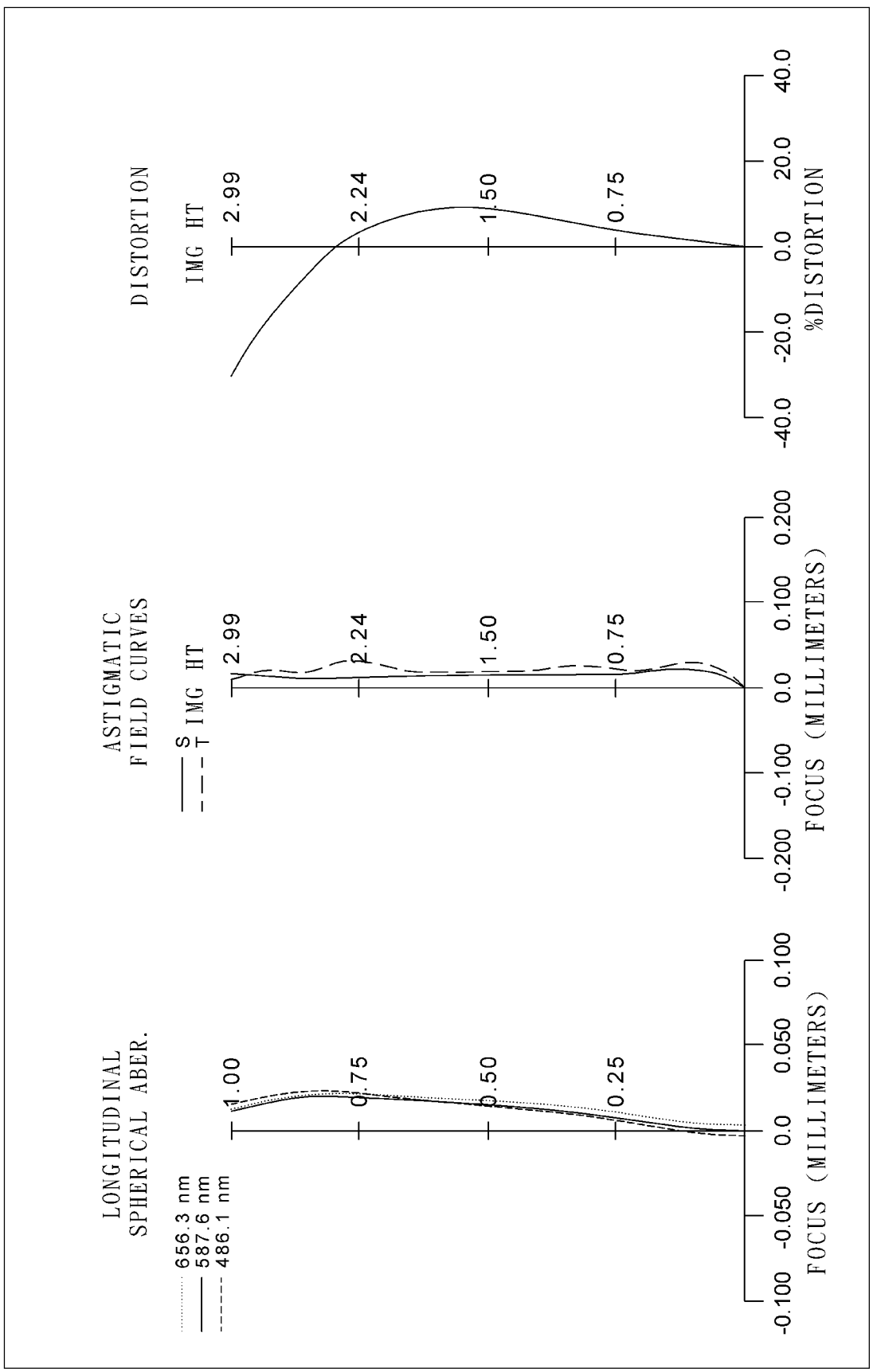
FIG. 7B shows longitudinal spherical aberration curves, astigmatic field curves and a distortion curve of the imaging apparatus according to the 7th embodiment.

FIG. 7A is a schematic view of an imaging apparatus according to the 7th embodiment of the present disclosure. FIG. 7B shows, in order from left to right, longitudinal spherical aberration curves, astigmatic field curves and a distortion curve of the imaging apparatus according to the 7th embodiment.

In FIG. 7A, the imaging apparatus includes an optical lens assembly (not otherwise herein labeled) of the present disclosure and an image sensor 785. The optical lens assembly includes, in order from an object side to an image side, a first lens element 710, a second lens element 720, an aperture stop 700, a third lens element 730, a stop 701, a fourth lens element 740, a fifth lens element 750, a sixth lens element 760, an IR cut filter 770, and an image surface 780. There is no additional lens element inserted between the first lens element 710 and the sixth lens element 760.

The first lens element 710 with negative refractive power has an object-side surface 711 being concave in a paraxial region thereof, and an image-side surface 712 being convex in a paraxial region thereof. Both the object-side surface 711 and the image-side surface 712 are aspheric and there is at least one convex critical point in an off-axis region of the object-side surface 711. The first lens element 710 is made of plastic material.

The second lens element 720 with negative refractive power has an object-side surface 721 being concave in a paraxial region thereof, and an image-side surface 722 being concave in a paraxial region thereof. Both the object-side surface 721 and the image-side surface 722 are aspheric. The second lens element 720 is made of plastic material.

The third lens element 730 with positive refractive power has an object-side surface 731 being convex in a paraxial region thereof, and an image-side surface 732 being convex in a paraxial region thereof. Both the object-side surface 731 and the image-side surface 732 are aspheric. The third lens element 730 is made of plastic material.

The fourth lens element 740 with negative refractive power has an object-side surface 741 being convex in a paraxial region thereof, and an image-side surface 742 being concave in a paraxial region thereof. Both the object-side surface 741 and the image-side surface 742 are aspheric, and there is at least one concave critical point in an off-axis region of the object-side surface 741. The fourth lens element 740 is made of plastic material.

The fifth lens element 750 with positive refractive power has an object-side surface 751 being concave in a paraxial region thereof, and an image-side surface 752 being convex in a paraxial region thereof. Both the object-side surface 751 and the image-side surface 752 are aspheric. The fifth lens element 750 is made of plastic material.

The sixth lens element 760 with negative refractive power has an object-side surface 761 being convex in a paraxial region thereof, and an image-side surface 762 being concave in a paraxial region thereof. Both the object-side surface 761 and the image-side surface 762 are aspheric, and there is at least one convex critical point in an off-axis region of the image-side surface 762. The sixth lens element 760 is made of plastic material.

The IR cut filter 770 is disposed between the sixth lens element 760 and the image surface 780. The IR cut filter 770 is made of glass material and will not affect the focal length of the optical lens assembly. The image sensor 785 is disposed on the image surface 780 of the optical lens assembly.

The detailed optical data of the 7th embodiment are shown in TABLE 13, and the aspheric surface data are shown in TABLE 14.

TABLE 13

(7th Embodiment)
f = 1.85 mm, Fno = 2.50, HFOV = 66.5 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Lens 1 | −3.698 | ASP | 0.775 | Plastic | 1.600 | 60.0 | −6.78 |
| 2 |  | −44.022 | ASP | 0.439 |  |  |  |  |
| 3 | Lens 2 | −100.000 | ASP | 0.571 | Plastic | 1.669 | 19.5 | −29.01 |
| 4 |  | 24.132 | ASP | 0.144 |  |  |  |  |
| 5 | Ape. Stop | Plano |  | −0.011 |  |  |  |  |
| 6 | Lens 3 | 4.790 | ASP | 0.636 | Plastic | 1.600 | 60.0 | 1.70 |
| 7 |  | −1.231 | ASP | −0.043 |  |  |  |  |
| 8 | Stop | Plano |  | 0.276 |  |  |  |  |
| 9 | Lens 4 | 4.028 | ASP | 0.250 | Plastic | 1.660 | 20.4 | −7.05 |
| 10 |  | 2.106 | ASP | 0.564 |  |  |  |  |
| 11 | Lens 5 | −1.940 | ASP | 0.752 | Plastic | 1.600 | 60.0 | 1.72 |
| 12 |  | −0.773 | ASP | 0.030 |  |  |  |  |
| 13 | Lens 6 | 1.421 | ASP | 0.340 | Plastic | 1.639 | 23.5 | −1.92 |
| 14 |  | 0.596 | ASP | 0.400 |  |  |  |  |
| 15 | IR Cut Filter | Plano |  | 0.145 | Glass | 1.517 | 64.2 | — |
| 16 |  | Plano |  | 0.300 |  |  |  |  |
| 17 | Image Surface | Plano |  | 0.000 |  |  |  |  |

Remark: Reference wavelength is d-line 587.6 nm.
* The effective radius of Surface 8 (Stop) is 0.760 mm.

TABLE 14

Aspheric Coefficient

| Surface # | 1 | 2 | 3 | 4 | 6 | 7 |
|---|---|---|---|---|---|---|
| k = | 1.6290E+00 | 4.8665E+01 | 9.0000E+01 | −8.9537E+01 | 3.6710E+01 | 4.1924E−01 |
| A4 = | 1.6473E−01 | 2.5351E−01 | 4.0088E−02 | 9.5065E−02 | −5.5707E−02 | −3.3359E−02 |
| A6 = | −8.6875E−02 | 3.4491E−02 | −2.3534E−01 | −1.3905E−01 | 3.1603E−01 | −2.9794E−01 |
| A8 = | 4.4336E−02 | −4.5107E−01 | 7.1432E−01 | 2.5282E+00 | −6.6878E+00 | 2.3468E+00 |
| A10 = | −1.5723E−02 | 1.0843E+00 | −1.5556E+00 | −1.6342E+01 | 4.7447E+01 | −1.0996E+01 |
| A12 = | 3.6212E−03 | −1.1989E+00 | 2.0070E+00 | 6.2759E+01 | −2.0063E+02 | 2.5692E+01 |
| A14 = | −4.7731E−04 | 6.9357E−01 | −1.4340E+00 | −1.2440E+02 | 4.5891E+02 | −3.0604E+01 |
| A16 = | 2.7179E−05 | −1.5482E−01 | 4.3769E−01 | 1.0855E+02 | −4.5267E+02 | 1.3269E+01 |

| Surface # | 9 | 10 | 11 | 12 | 13 | 14 |
|---|---|---|---|---|---|---|
| k = | 7.3080E+00 | −4.5111E−01 | 7.0597E−01 | −1.4768E+00 | −3.1079E+01 | −5.3774E+00 |
| A4 = | −2.8354E−01 | −1.5688E−01 | 1.9715E−01 | 3.4259E−01 | −1.0191E−01 | −1.5305E−01 |
| A6 = | 8.2805E−02 | −5.7491E−02 | −2.4555E−01 | −5.7747E−01 | −1.9951E−01 | 6.9137E−02 |
| A8 = | −4.6045E−01 | 3.2648E−01 | 2.5134E−01 | 5.2437E−01 | 2.1412E−01 | −2.0809E−02 |
| A10 = | 1.7528E+00 | −5.0409E−01 | −1.2988E−01 | −2.6835E−01 | −9.8697E−02 | 2.6796E−03 |
| A12 = | −4.1319E+00 | 4.0319E−01 | 4.6331E−02 | 8.3898E−02 | 2.5144E−02 | 1.7446E−04 |
| A14 = | 4.5526E+00 | −1.6642E−01 | −1.3298E−02 | −1.5164E−02 | −3.3977E−03 | −9.5615E−05 |
| A16 = | −2.0441E+00 | 2.7277E−02 | 2.2624E−03 | 1.2037E−03 | 1.8886E−04 | 8.0589E−06 |

In the 7th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 7th embodiment, so an explanation in this regard will not be provided again.

Moreover, these parameters can be calculated from TABLE 13 and TABLE 14 and satisfy the conditions stated in table below.

| 7th Embodiment | | | |
|---|---|---|---|
| f [mm] | 1.85 | V6/N6 | 14.34 |
| Fno | 2.50 | (R5 + R6)/(R5 − R6) | 0.59 |
| HFOV [deg.] | 66.5 | R1/Td | −0.78 |
| FOV [deg.] | 133.0 | f1/R1 | 1.83 |
| V2 | 19.45 | f/R1 | −0.50 |
| V30 | 3 | f1/f4 | 0.96 |
| V1/N1 | 37.50 | (f2 − f4 − f6)/f | −10.84 |
| V2/N2 | 11.66 | \|f/f1\| + \|f/f2\| | 0.34 |
| V3/N3 | 37.50 | f/f2 | −0.06 |
| V4/N4 | 12.29 | TL/ImgH | 1.86 |
| V5/N5 | 37.50 | Y11/Y62 | 0.91 |

8th Embodiment

Figure 8A:
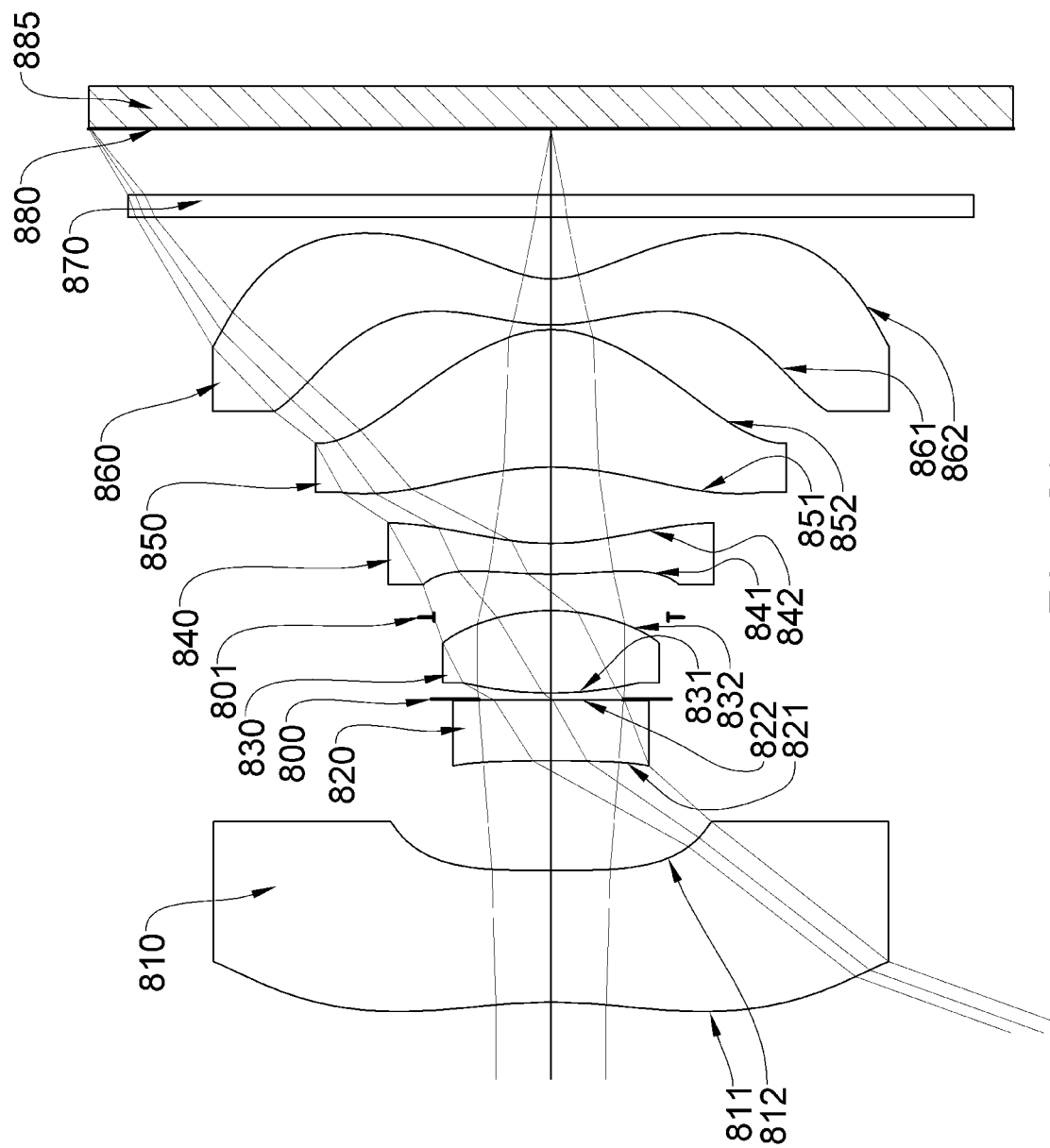
FIG. 8A is a schematic view of an imaging apparatus according to the 8th embodiment of the present disclosure.
Figure 8B:
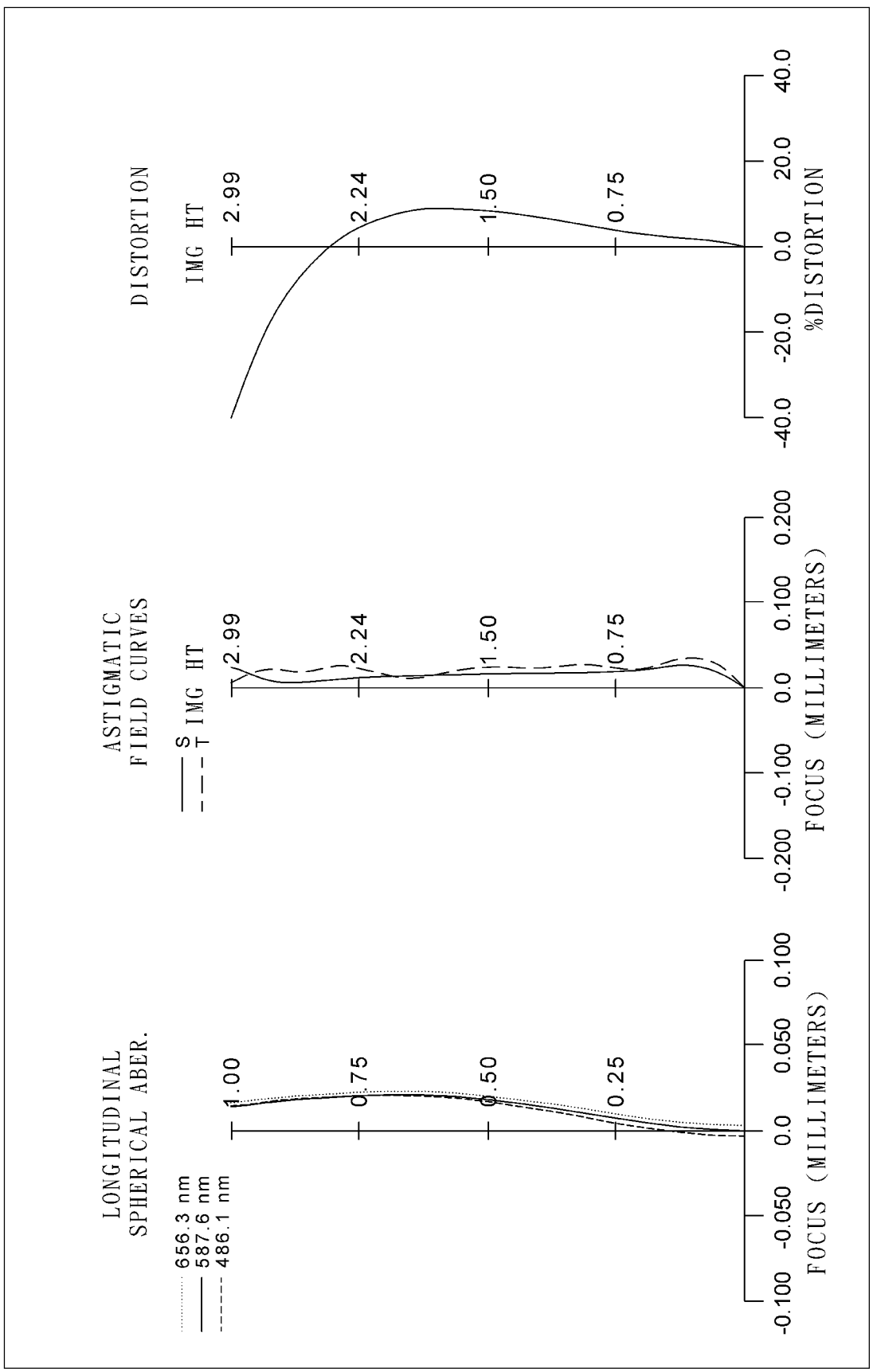
FIG. 8B shows longitudinal spherical aberration curves, astigmatic field curves and a distortion curve of the imaging apparatus according to the 8th embodiment.

FIG. 8A is a schematic view of an imaging apparatus according to the 8th embodiment of the present disclosure. FIG. 8B shows, in order from left to right, longitudinal spherical aberration curves, astigmatic field curves and a distortion curve of the imaging apparatus according to the 8th embodiment.

In FIG. 8A, the imaging apparatus includes an optical lens assembly (not otherwise herein labeled) of the present disclosure and an image sensor 885. The optical lens assembly includes, in order from an object side to an image side, a first lens element 810, a second lens element 820, an aperture stop 800, a third lens element 830, a stop 801, a fourth lens element 840, a fifth lens element 850, a sixth lens element 860, an IR cut filter 870, and an image surface 880. There is no additional lens element inserted between the first lens element 810 and the sixth lens element 860.

The first lens element 810 with negative refractive power has an object-side surface 811 being concave in a paraxial region thereof, and an image-side surface 812 being concave in a paraxial region thereof. Both the object-side surface 811 and the image-side surface 812 are aspheric and there is at least one convex critical point in an off-axis region of the object-side surface 811. The first lens element 810 is made of plastic material.

The second lens element 820 with negative refractive power has an object-side surface 821 being concave in a paraxial region thereof, and an image-side surface 822 being convex in a paraxial region thereof. Both the object-side surface 821 and the image-side surface 822 are aspheric. The second lens element 820 is made of plastic material.

The third lens element 830 with positive refractive power has an object-side surface 831 being convex in a paraxial region thereof, and an image-side surface 832 being convex in a paraxial region thereof. Both the object-side surface 831 and the image-side surface 832 are aspheric. The third lens element 830 is made of plastic material.

The fourth lens element 840 with negative refractive power has an object-side surface 841 being convex in a paraxial region thereof, and an image-side surface 842 being concave in a paraxial region thereof. Both the object-side surface 841 and the image-side surface 842 are aspheric, and there is at least one concave critical point in an off-axis region of the object-side surface 841. The fourth lens element 840 is made of plastic material.

The fifth lens element 850 with positive refractive power has an object-side surface 851 being concave in a paraxial region thereof, and an image-side surface 852 being convex in a paraxial region thereof. Both the object-side surface 851 and the image-side surface 852 are aspheric. The fifth lens element 850 is made of plastic material.

The sixth lens element 860 with negative refractive power has an object-side surface 861 being convex in a paraxial region thereof, and an image-side surface 862 being concave in a paraxial region thereof. Both the object-side surface 861 and the image-side surface 862 are aspheric, and there is at least one convex critical point in an off-axis region of the image-side surface 862. The sixth lens element 860 is made of plastic material.

The IR cut filter 870 is disposed between the sixth lens element 860 and the image surface 880. The IR cut filter 870 is made of glass material and will not affect the focal length of the optical lens assembly. The image sensor 885 is disposed on the image surface 880 of the optical lens assembly.

The detailed optical data of the 8th embodiment are shown in TABLE 15, and the aspheric surface data are shown in TABLE 16.

TABLE 15

(8th Embodiment)
f = 1.81 mm, Fno = 2.52, HFOV = 70.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −3.340 | ASP | 0.857 | Plastic | 1.544 | 56.0 | −5.43 |
| 2 | | 27.747 | ASP | 0.713 | | | | |
| 3 | Lens 2 | −15.282 | ASP | 0.396 | Plastic | 1.639 | 23.5 | −28.30 |
| 4 | | −100.000 | ASP | 0.006 | | | | |
| 5 | Ape. Stop | Plano | | 0.039 | | | | |
| 6 | Lens 3 | 2.492 | ASP | 0.536 | Plastic | 1.544 | 56.0 | 1.69 |
| 7 | | −1.342 | ASP | −0.042 | | | | |
| 8 | Stop | Plano | | 0.279 | | | | |
| 9 | Lens 4 | 3.172 | ASP | 0.200 | Plastic | 1.669 | 19.5 | −6.20 |
| 10 | | 1.752 | ASP | 0.496 | | | | |
| 11 | Lens 5 | −1.896 | ASP | 0.895 | Plastic | 1.544 | 56.0 | 1.63 |
| 12 | | −0.705 | ASP | 0.030 | | | | |
| 13 | Lens 6 | 1.115 | ASP | 0.300 | Plastic | 1.669 | 19.5 | −2.04 |
| 14 | | 0.548 | ASP | 0.400 | | | | |

TABLE 15-continued (8th Embodiment)
f = 1.81 mm, Fno = 2.52, HFOV = 70.0 deg.

| Surface # | | Curvature Radius | Thickness | Material | Index | Abbe # | Focal Length |
|---|---|---|---|---|---|---|---|
| 15 | IR Cut Filter | Plano | 0.145 | Glass | 1.517 | 64.2 | — |
| 16 | | Plano | 0.432 | | | | |
| 17 | Image Surface | Plano | 0.000 | | | | |

Remark: Reference wavelength is d-line 587.6 nm.
* The effective radius of Surface 8 (Stop) is 0.760 mm.

TABLE 16

Aspheric Coefficient

| Surface # | 1 | 2 | 3 | 4 | 6 | 7 |
|---|---|---|---|---|---|---|
| k = | 9.0660E−01 | −9.0000E+01 | 9.0000E+01 | 9.0000E+01 | 1.2038E+01 | −1.0778E−01 |
| A4 = | 1.4074E−01 | 2.0596E−01 | −5.2914E−02 | 6.8922E−03 | −2.9422E−02 | 2.2538E−02 |
| A6 = | −6.5643E−02 | 7.2316E−02 | −2.1151E−01 | −2.7346E−01 | −2.2391E−01 | −1.4149E−01 |
| A8 = | 2.9421E−02 | −3.7682E−01 | 2.7585E−01 | 1.3709E+00 | −1.9950E+00 | 2.3290E−01 |
| A10 = | −9.3209E−03 | 8.0980E−01 | 9.8525E−01 | −1.5367E+01 | 1.4573E+01 | 2.1332E+00 |
| A12 = | 1.9287E−03 | −8.4726E−01 | −9.0431E+00 | 1.0196E+02 | −6.0728E+01 | −1.5040E+01 |
| A14 = | −2.3073E−04 | 4.9207E−01 | 2.0981E+01 | −3.2451E+02 | 1.2821E+02 | 3.1405E+01 |
| A16 = | 1.1992E−05 | −1.1331E−01 | −1.6638E+01 | 4.0124E+02 | −1.1974E+02 | −2.4240E+01 |

| Surface # | 9 | 10 | 11 | 12 | 13 | 14 |
|---|---|---|---|---|---|---|
| k = | −5.4449E+00 | −1.3521E+00 | 5.2935E−01 | −1.4978E+00 | −1.7155E+01 | −4.7740E+00 |
| A4 = | −2.5997E−01 | −1.7431E−01 | 2.1080E−01 | 3.5411E−01 | −4.4889E−02 | −1.5287E−01 |
| A6 = | −1.5675E−01 | −1.7022E−01 | −2.6321E−01 | −6.6233E−01 | −2.6792E−01 | 5.5309E−02 |
| A8 = | 2.5223E−01 | 6.9699E−01 | 4.3433E−01 | 6.5807E−01 | 2.9565E−01 | −6.5822E−03 |
| A10 = | 3.8222E−01 | −1.0485E+00 | −3.8810E−01 | −3.3433E−01 | −1.6130E−01 | −4.0621E−03 |
| A12 = | −2.3973E+00 | 8.4230E−01 | 1.9447E−01 | 8.4745E−02 | 4.8166E−02 | 1.8735E−03 |
| A14 = | 3.0966E+00 | −3.4848E−01 | −5.1441E−02 | −7.9801E−03 | −7.3150E−03 | −3.2444E−04 |
| A16 = | −1.6189E+00 | 5.7509E−02 | 5.7623E−03 | −1.5523E−04 | 4.4014E−04 | 2.1145E−05 |

In the 8th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 8th embodiment, so an explanation in this regard will not be provided again.

Moreover, these parameters can be calculated from TABLE 15 and TABLE 16 and satisfy the conditions stated in table below.

| 8th Embodiment | | | |
|---|---|---|---|
| f [mm] | 1.81 | V6/N6 | 11.66 |
| Fno | 2.52 | (R5 + R6)/(R5 − R6) | 0.30 |
| HFOV [deg.] | 70.0 | R1/Td | −0.71 |
| FOV [deg.] | 140.0 | f1/R1 | 1.62 |
| V2 | 23.49 | f/R1 | −0.54 |
| V30 | 3 | f1/f4 | 0.88 |
| V1/N1 | 36.26 | (f2 − f4 − f6)/f | −11.10 |
| V2/N2 | 14.34 | |f/f1| + |f/f2| | 0.40 |
| V3/N3 | 36.26 | f/f2 | −0.06 |
| V4/N4 | 11.66 | TL/ImgH | 1.90 |
| V5/N5 | 36.26 | Y11/Y62 | 1.00 |

9th Embodiment

Figure 10A:
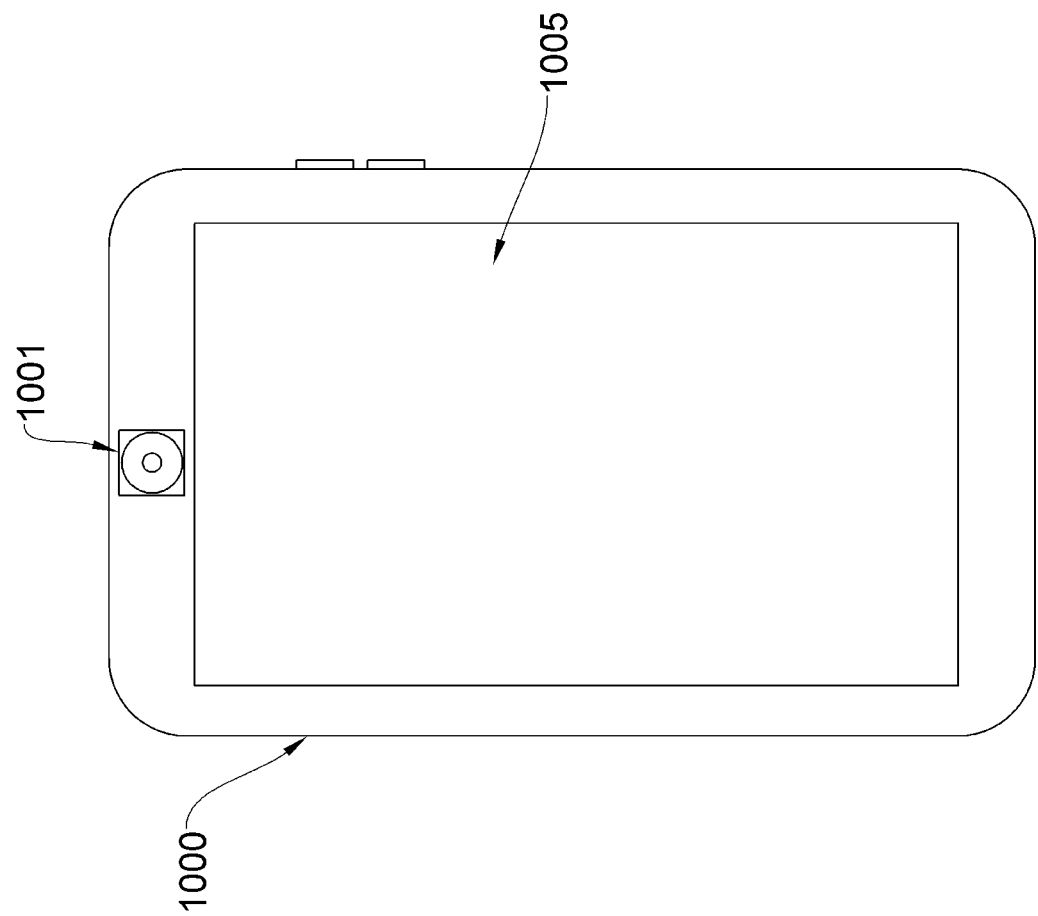
FIG. 10A shows a front view of an electronic device according to the 9th embodiment of the present disclosure.

Please refer to FIG. 10A and FIG. 10B. FIG. 10A shows a front view of an electronic device 1000. FIG. 10B shows a rear view of the electronic device of FIG. 10A. In the present embodiment, the electronic device 1000 is a smartphone. The electronic device 1000 includes an imaging apparatus 1001, an imaging apparatus 1002, an imaging apparatus 1003, an imaging apparatus 1004, and a display device 1005. As shown in FIG. 10A, the imaging apparatus 1001 is located above the display device 1005 of the electronic device 1000. As shown in FIG. 10B, the imaging apparatus 1001, the imaging apparatus 1002, and the imaging apparatus 1003 are facing toward the same direction and arranged horizontally along the upper edge of the back side of the electronic device 1000. The imaging apparatus 1001 and the imaging apparatus 1002 can include the optical lens assembly according to the 1st embodiment of the present disclosure. The imaging apparatus 1004 includes a telephoto. The imaging apparatus 1003 includes a lens assembly with a viewing angle between the viewing angles of the imaging apparatus 1002 and the imaging apparatus 1004.

Figure 10C:
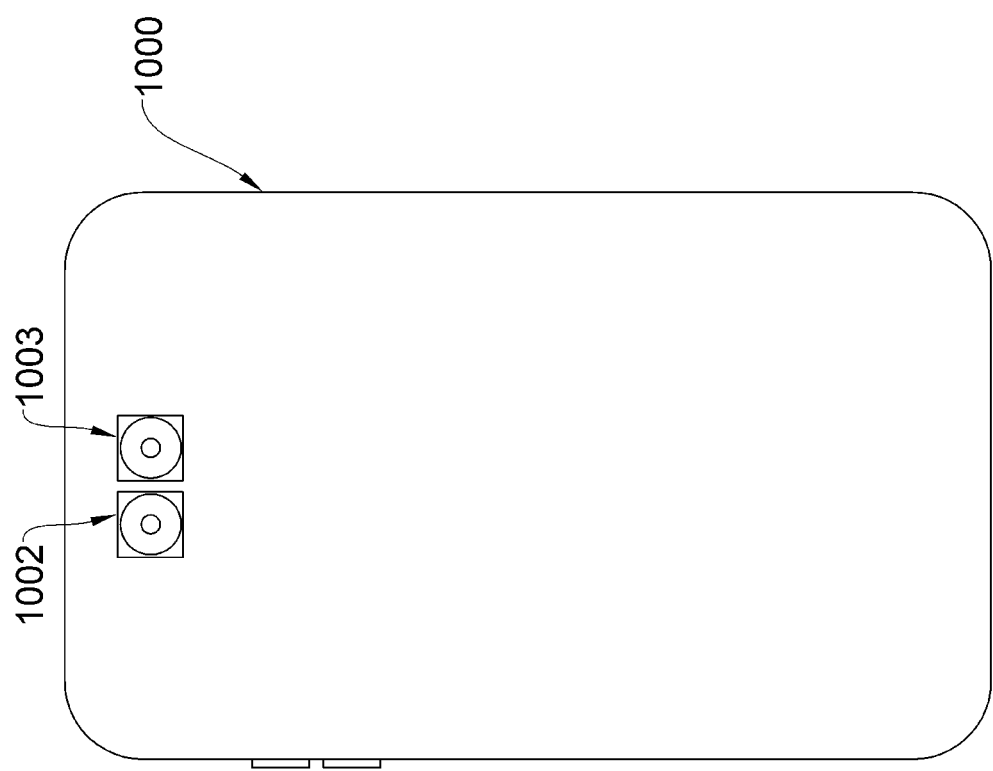
FIG. 10C shows a rear view of a variation of the electronic device according to the 9th embodiment of the present disclosure.

The aforementioned electronic devices are only exemplary, and the application of the imaging apparatus according to the present disclosure is not limited thereto. For example, FIG. 10C shows a rear view of a variation of the electronic device in the 9th embodiment of the present disclosure. The back side of the electronic device 1000 includes only the imaging apparatus 1002 and the imaging apparatus 1003, which are facing toward the same direction and arranged horizontally along the upper edge of the back side of the electronic device 1000. The imaging apparatus 1002 can include the optical lens assembly according to the 1st embodiment of the present disclosure. The imaging apparatus 1003 includes a lens assembly with a viewing angle smaller than the viewing angle of the imaging apparatus 1002. Moreover, the electronic device can further include a control unit, a display unit, a storage unit, a random access memory (RAM) unit or a combination thereof.

The foregoing description, for purpose of explanation, has been described with reference to specific embodiments. It is to be noted that TABLES 1-16 show different data of the different embodiments; however, the data of the different embodiments are obtained from experiments. The embodiments were chosen and described in order to best explain the principles of the disclosure and its practical applications, and thereby to enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical lens assembly, comprising, in order from an object side to an image side:
    a first lens element with negative refractive power having an object-side surface being concave in a paraxial region thereof, at least one convex critical point in an off-axis region of the object-side surface thereof, and both the object-side surface and an image-side surface thereof being aspheric;
    a second lens element having negative refractive power;
    a third lens element having positive refractive power;
    a fourth lens element having negative refractive power;
    a fifth lens element having positive refractive power; and
    a sixth lens element with negative refractive power having an image-side surface being concave in a paraxial region thereof, at least one convex critical point in an off-axis region of the image-side surface thereof, and both an object-side surface and the image-side surface thereof being aspheric,
    wherein the optical lens assembly has a total of six lens elements, a focal length of the optical lens assembly is f, a curvature radius of the object-side surface of the first lens element is R1, and the following condition is satisfied:

$f/R1<-0.40$.

2. The optical lens assembly of claim 1, wherein a curvature radius of an object-side surface of the third lens element is R5, a curvature radius of an image-side surface of the third lens element is R6, and the following condition is satisfied:

$0<(R5+R6)/(R5-R6)$.

3. The optical lens assembly of claim 1, wherein the focal length of the optical lens assembly is f, a focal length of the first lens element is f1, a focal length of the second lens element is f2, and the following condition is satisfied:

$|f/f1|+|f/f2|<0.50$.

4. The optical lens assembly of claim 1, wherein the fourth lens element has an object-side surface being convex in a paraxial region thereof and at least one concave critical point in an off-axis region of the object-side surface thereof.

5. The optical lens assembly of claim 1, wherein a maximal field of view of the optical lens assembly is FOV, an axial distance between the object-side surface of the first lens element and an image surface is TL, a maximum image height of the optical lens assembly is ImgH, and the following conditions are satisfied:

100 degrees<$FOV$<180 degrees; and $TL/ImgH<2.0$.

6. The optical lens assembly of claim 1, wherein the focal length of the optical lens assembly is f, the curvature radius of the object-side surface of the first lens element is R1, and the following condition is satisfied:

$-1.50<f/R1<-0.50$.

7. The optical lens assembly of claim 1, wherein an Abbe number of the second lens element is V2, and the following condition is satisfied:

$V2<32$.

8. The optical lens assembly of claim 1, wherein a total amount of lens elements with the Abbe number thereof being smaller than 30 is V30, and the following condition is satisfied:

$3<V30$.

9. The optical lens assembly of claim 1, wherein the fifth lens element has an object-side surface being concave in a paraxial region thereof, the fifth lens element has an image-side surface being convex in a paraxial region thereof, the sixth lens element has the object-side surface being convex in a paraxial region thereof.

10. The optical lens assembly of claim 1, wherein the focal length of the optical lens assembly is f, a focal length of the second lens element is f2, a focal length of the fourth lens element is f4, a focal length of the sixth lens element is f6, and the following condition is satisfied:

$(f2-f4-f6)/f<-3.0$.

11. The optical lens assembly of claim 1, wherein a vertical distance between a maximum effective diameter position on the object-side surface of the first lens element and an optical axis is Y11, a vertical distance between a maximum effective diameter position on the image-side surface of the sixth lens element and the optical axis is Y62, and the following condition is satisfied:

$Y11/Y62<1.20$.

12. The optical lens assembly of claim 1, wherein the focal length of the optical lens assembly is f, a focal length of the second lens element is f2, and the following condition is satisfied:

$f/f2<-0.05$.

13. The optical lens assembly of claim 1, wherein a focal length of the first lens element is f1, the curvature radius of the object-side surface of the first lens element is R1, and the following condition is satisfied:

$1.0<f1/R1$.

14. The optical lens assembly of claim 1, wherein the first lens element has an image-side surface being convex in a paraxial region thereof and at least one concave critical point in an off-axis region of the image-side surface thereof.

15. The optical lens assembly of claim 1, wherein the curvature radius of the object-side surface of the first lens element is R1, an axial distance between the object-side surface of the first lens element and the image-side surface of the sixth lens element is Td, and the following condition is satisfied:

$R1/Td \leq -0.75$.

16. The optical lens assembly of claim 1, wherein a focal length of the first lens element is f1, a focal length of the fourth lens element is f4, and the following condition is satisfied:

$$0.75 < f1/f4.$$

17. The optical lens assembly of claim 1, wherein an Abbe number of a lens element is V, a refractive index of the lens element is N, and at least one lens element of the optical lens assembly satisfies the following condition:

$$8.0 < V/N < 12.0.$$

18. An imaging apparatus, comprising the optical lens assembly of claim 1 and an image sensor disposed on an image surface of the optical lens assembly.

19. An electronic device, comprising at least two imaging apparatuses facing toward a same side, wherein at least one of the at least two imaging apparatuses is the imaging apparatus of claim 18, and the fields of view of the at least two imaging apparatuses differ by at least 20 degrees.

20. The electronic device of claim 19, wherein the fields of view of the at least two imaging apparatuses differ by at least 60 degrees.

\* \* \* \* \*